(12) United States Patent
Shorter et al.

(10) Patent No.: US 11,946,478 B2
(45) Date of Patent: Apr. 2, 2024

(54) FAN ASSEMBLY

(71) Applicant: Dyson Technology Limited, Wiltshire (GB)

(72) Inventors: David John Shorter, Swindon (GB); Liam Craig Barclay, Bristol (GB); Mark Douglas Whiting, Bristol (GB); Victoria Isabelle Palmer, Gloucester (GB); Jonathan Edward Clear, Bath (GB); Edward Michael Waugh, Swindon (GB); Daniel James Beavis, Bristol (GB); Thomas Sideropoulos, Bristol (GB); James Benjamin Brooks, Bristol (GB)

(73) Assignee: Dyson Technology Limited, Wiltshire (GB)

( * ) Notice: Subject to any disclaimer, the term of this patent is extended or adjusted under 35 U.S.C. 154(b) by 213 days.

(21) Appl. No.: 16/977,531

(22) PCT Filed: Feb. 27, 2019

(86) PCT No.: PCT/GB2019/050543
§ 371 (c)(1),
(2) Date: Sep. 2, 2020

(87) PCT Pub. No.: WO2019/171024
PCT Pub. Date: Sep. 12, 2019

(65) Prior Publication Data
US 2020/0400152 A1    Dec. 24, 2020

(30) Foreign Application Priority Data
Mar. 5, 2018  (GB) ..................... 1803499

(51) Int. Cl.
*F04D 25/08*   (2006.01)
*F04D 27/00*   (2006.01)
*F04D 29/42*   (2006.01)

(52) U.S. Cl.
CPC .......... *F04D 25/08* (2013.01); *F04D 27/004* (2013.01); *F04D 29/4226* (2013.01)

(58) Field of Classification Search
CPC ...... F04D 25/08; F04D 27/001; F04D 27/004; F04D 29/4226; F24F 11/32; F24F 11/52;
(Continued)

(56) References Cited

U.S. PATENT DOCUMENTS 2,488,467 A   11/1949   De Lisio
6,448,896 B1   9/2002   Bankus et al.
(Continued)

FOREIGN PATENT DOCUMENTS

CN   101063455 A   10/2007
CN   102798195 A   11/2012
(Continued)

OTHER PUBLICATIONS

Office Action received for Chinese Patent Application No. 201980017399.5, dated Apr. 15, 2022, 27 pages (16 pages of English Translation and 11 pages of Original Document).
(Continued)

*Primary Examiner* — Alexander B Comley
(74) *Attorney, Agent, or Firm* — Tucker Ellis LLP; Michael G. Craig

(57) ABSTRACT

There is provided a fan assembly comprising a motor-driven impeller arranged to generate an airflow, an air outlet arranged to emit the airflow, a plurality of sensors arranged to measure a value for each of a plurality of air quality characteristics, a display and a processor. The processor is configured to receive measured values for each of the
(Continued)

plurality of air quality characteristics, identify one of a corresponding set of intervals within which the measured value falls and select an air quality index value associated with the identified interval. The processor is then configured to identify the highest of the selected air quality index values as a current overall air quality index value and to cause the display to display a time series plot of the current air quality index value and a number of preceding air quality index values.

37 Claims, 12 Drawing Sheets

(58) Field of Classification Search
CPC ..... F24F 11/77; F24F 2110/50–52; F04F 5/16
See application file for complete search history.

(56) References Cited

U.S. PATENT DOCUMENTS

| | | | |
|---|---|---|---|
| 6,494,940 B1 * | 12/2002 | Hak | B01D 46/10 96/417 |
| 2005/0268580 A1 | 12/2005 | Kisakibaru et al. | |
| 2006/0154569 A1 | 7/2006 | Doyle et al. | |
| 2006/0181436 A1 | 8/2006 | Moriya et al. | |
| 2007/0253831 A1 | 11/2007 | Lee | |
| 2009/0150116 A1 | 6/2009 | Lin | |
| 2010/0316501 A1 | 12/2010 | Bain | |
| 2013/0280099 A1 | 10/2013 | Park et al. | |
| 2014/0205340 A1 | 7/2014 | Yamaguchi et al. | |
| 2014/0271235 A1 | 9/2014 | Magyar | |
| 2016/0121255 A1 | 5/2016 | Zhang et al. | |
| 2017/0087500 A1 * | 3/2017 | Combs | F24F 7/06 |
| 2017/0117840 A1 | 4/2017 | Suzuki et al. | |
| 2018/0154297 A1 | 6/2018 | Maletich et al. | |
| 2018/0223855 A1 | 8/2018 | Wu et al. | |
| 2019/0003730 A1 | 1/2019 | Su et al. | |
| 2020/0400335 A1 | 12/2020 | Shorter et al. | |

FOREIGN PATENT DOCUMENTS

| | | | | |
|---|---|---|---|---|
| CN | 103375390 A | | 10/2013 | |
| CN | 204164052 U | | 2/2015 | |
| CN | 204963002 U | | 1/2016 | |
| CN | 205478426 U | | 8/2016 | |
| CN | 107024569 A | * | 8/2017 | ......... G01N 33/0062 |
| CN | 107024569 A | | 8/2017 | |
| CN | 107061336 A | | 8/2017 | |
| CN | 107131141 A | | 9/2017 | |
| CN | 111836970 B | | 3/2022 | |
| EP | 2527755 A2 | | 11/2012 | |
| GB | 2509111 A | | 6/2014 | |
| GB | 2539449 A | | 12/2016 | |
| GB | 2539449 A | * | 12/2016 | ............ F24F 11/001 |
| JP | 2004-510118 A | | 4/2004 | |
| WO | 02/26349 A1 | | 4/2002 | |
| WO | 2010/046691 A1 | | 4/2010 | |
| WO | 2010/100451 A1 | | 9/2010 | |
| WO | 2012/017219 A1 | | 2/2012 | |
| WO | 2016/128732 A1 | | 8/2016 | |

OTHER PUBLICATIONS

International Search Report and Written Opinion dated May 15, 2019, directed to International Application No. PCT/GB2019/050543; 13 pages.

Search Report dated Sep. 5, 2018, directed to GB Application No. 1803499.1; 1 page.

International Search Report and Written Opinion received for PCT Patent Application No. PCT/GB2019/050540, dated May 14, 2019, 8 pages.

Search Report dated Aug. 30, 2018, directed to GB Application No. 1803500.6; 1 page.

Office Action received for Chinese Patent Application No. 201980017399.5, dated Aug. 31, 2022, 12 pages (7 pages of English Translation and 5 pages of Original Document).

Office Action received for Chinese Patent Application No. 201980017399.5, dated Oct. 11, 2021, 27 pages (17 pages of English Translation and 10 pages of Original Document).

Office Action received for Patent Application No. KR 10-2020-7027416, dated Apr. 21, 2022, 14 pages (7 pages of English Translation and 7 pages of Original Document).

Office Action received for Chinese Patent Application No. 201980017397.6, dated Aug. 20, 2021, 31 pages (20 pages of English Translation and 11 pages of Original Document).

* cited by examiner

FAN ASSEMBLY

REFERENCE TO RELATED APPLICATIONS

This application is a national stage application under 35 USC 371 of International Application No. PCT/GB2019/050543, filed Feb. 27, 2019, which claims the priority of United Kingdom Application No. 1803499.1, filed Mar. 5, 2018, the entire contents of each of which are incorporated herein by reference.

FIELD OF THE DISCLOSURE

The present invention relates to a fan assembly and a computer-implemented method of generating a display providing an indication of air quality.

BACKGROUND OF THE DISCLOSURE

A conventional domestic fan typically includes a set of blades or vanes mounted for rotation about an axis, and drive apparatus for rotating the set of blades to generate an airflow. The movement and circulation of the airflow creates a 'wind chill' or breeze and, as a result, the user experiences a cooling effect as heat is dissipated through convection and evaporation. The blades are generally located within a cage which allows an airflow to pass through the housing while preventing users from coming into contact with the rotating blades during use of the fan.

U.S. Pat. No. 2,488,467 describes a fan which does not use caged blades to project air from the fan assembly. Instead, the fan assembly comprises a base which houses a motor-driven impeller for drawing an airflow into the base, and a series of concentric, annular nozzles connected to the base and each comprising an annular outlet located at the front of the nozzle for emitting the airflow from the fan. Each nozzle extends about a bore axis to define a bore about which the nozzle extends.

Each nozzle is in the shape of an airfoil may therefore be considered to have a leading edge located at the rear of the nozzle, a trailing edge located at the front of the nozzle, and a chord line extending between the leading and trailing edges. In U.S. Pat. No. 2,488,467 the chord line of each nozzle is parallel to the bore axis of the nozzles. The air outlet is located on the chord line, and is arranged to emit the airflow in a direction extending away from the nozzle and along the chord line.

Another fan assembly which does not use caged blades to project air from the fan assembly is described in WO 2010/100451. This fan assembly comprises a cylindrical base which also houses a motor-driven impeller for drawing a primary airflow into the base, and a single annular nozzle connected to the base and comprising an annular mouth/outlet through which the primary airflow is emitted from the fan. The nozzle defines an opening through which air in the local environment of the fan assembly is drawn by the primary airflow emitted from the mouth, amplifying the primary airflow. The nozzle includes a Coanda surface over which the mouth is arranged to direct the primary airflow. The Coanda surface extends symmetrically about the central axis of the opening so that the airflow generated by the fan assembly is in the form of an annular jet having a cylindrical or frusto-conical profile.

WO 2010/046691 also describes a fan assembly. The fan assembly comprises a cylindrical base which houses a motor-driven impeller for drawing a primary air flow into the base, and an annular nozzle connected to the base and comprising an annular air outlet through which the primary air flow is emitted from the fan. The fan assembly comprises a filter for removing particulates from the air flow. The filter may be provided upstream from motor-driven impeller, in which case particulates are removed from the air flow prior to passing through the impeller. This protects the impeller from debris and dust that may be drawn into the fan assembly and which may damage the fan assembly. Alternatively, the filter may be provided downstream from the motor-driven impeller. In this configuration it is possible to filter and clean the air drawn through the motor-driven impeller, including any exhaust emissions, prior to progression through the elements of the fan assembly and supply to the user.

WO 2016/128732 describes a fan assembly similar to those of WO 2010/100451 and WO 2010/046691. The fan assembly is provided with air inlets that extend around the entire circumference of the body of the fan in order to maximise the area available for air to be drawn into the fan assembly. The fan assembly is therefore also provided with a tubular, barrel-type filter that fits concentrically over the body of the fan and surrounds the entire circumference of the fan body upstream from the air inlets, and a nozzle that is removably mounted on the body. The filter is not connected to either the body or the nozzle but is securely held in place by the nozzle when mounted on the body, and can only be removed from the fan assembly after removal of the nozzle. This arrangement provides that the filter may simply be lowered onto the body before being secured in place by the engagement of the nozzle with the body and further provides that the filter can easily be removed from the body after removal of the nozzle in order to allow for cleaning or replacement of the filter.

The fan assemblies described in each of WO 2010/100451, WO 2010/046691, and WO 2016/128732 each comprise a plurality of user-operable buttons that enable a user to operate the fan. WO 2012/017219 then also describes a fan assembly, in the form of a portable fan heater, which is provided with a plurality of user-operable buttons for enabling a user to control various functions of the fan assembly and that is also provided with a display for providing the user with a visual indication of a temperature setting of the fan assembly. Similarly, GB2509111 describes a fan assembly that is provided with a user interface circuit comprising both a user-actuable switch for operating the fan assembly and a display for displaying a current operational setting of the fan assembly. In particular, the number of the current speed setting of the fan assembly is displayed on the display. In both WO 2012/017219 and GB 2509111 the display is in the form of a dual/two-digit seven segment LED display.

SUMMARY OF THE DISCLOSURE

According to a first aspect there is provided a fan assembly comprising a motor-driven impeller arranged to generate an airflow, an air outlet arranged to emit the airflow from the fan assembly, a plurality of sensors arranged to measure a value for each of a plurality of air quality characteristics, a display arranged to present data to a user of the fan assembly, and a processor. The processor is configured to receive, from the plurality of sensors, measured values for each of the plurality of air quality characteristics, for each of the plurality of air quality characteristics, identify one of a corresponding set of intervals within which the measured value falls and select an air quality index value associated with the identified interval. The processor is then configured to identify the highest of the selected air quality index values as a current overall air quality index value and to cause the display to display a time series plot of the current air quality index value and a number of preceding air quality index values.

The present invention provides a fan assembly that displays to the user a live indication of the current air quality that is an instantly and continuously updated during operation of the fan assembly. This is particularly useful when the fan assembly provides air purification functionality as it provides the user with up-to-date information relating to the quality of the ambient air so that the user can determine if the current operational settings of the fan assembly (e.g. the speed of the motor-driven impeller) should be changed in view of the current air quality. In addition, if the fan assembly provides air purification functionality and has an automatic mode in which the operational settings of the fan assembly are automatically adjusted to take account of any changes in the measured air quality, then the provision of an instantly and continuously updated display of both the current and previous air quality provides the user with information from which they can deduce why an automated change in the operation of the fan assembly has occurred (i.e. in response to some air quality event).

The processor may be further configured to use the selected air quality index values to set a speed of the motor-driven impeller. To do so, the processor may be configured to, for each of the measured air quality characteristics, generate a corresponding speed index value using the selected air quality index value, and to set a speed of the motor-driven impeller in dependence upon the highest of the speed index values The plurality of air quality characteristics may comprise any of a concentration of $PM_{2.5}$ particles, a concentration of $PM_{10}$ particles, a concentration of volatile organic compounds, a concentration of nitrogen dioxide, a concentration sulphur dioxide, and a concentration of ozone.

The plurality sensors may comprise one or more particulate sensors and one or more gas sensors. The one or more particulate sensors may be arranged to measure a value indicative of a concentration of particles with a diameter that is 2.5 μm or less and measure a value indicative of a concentration of particles with a diameter that is 10 μm or less. Alternatively, the one or more particulate sensors may be arranged to measure a value indicative of a concentration of particles with a median aerodynamic diameter of less than 2.5 μm and measure a value indicative of a concentration of particles with a median aerodynamic diameter of less than 10 μm. The one or more gas sensors may be arranged to measure a value indicative of each of a concentration of volatile organic compounds and a concentration of nitrogen dioxide. The one or more gas sensors may comprise a reducing gas sensor and an oxidising sensor. The reducing gas sensor may then be arranged to provide a value indicative of a concentration of volatile organic compounds and the oxidising sensor may be arranged to provide a value indicative of a concentration of nitrogen dioxide.

To cause the display to display a time series plot of the current overall air quality index value and a number of preceding overall air quality index values, the processor may be configured to, for each of the current overall air quality index value and a number of preceding overall air quality index values, generate a component on the display representing the overall air quality index value within the time series plot. The processor may be further configured to, for each of the current overall air quality index value and a number of preceding overall air quality index values, identify one of a corresponding plurality of intervals within which the overall air quality index value falls, select a colour associated with the identified interval, and generate the component representing the air quality index value of the time series plot on the display using the selected colour.

The processor may be configured to perform the step of causing the display to display a time series plot of the current overall air quality index value and a number of preceding overall air quality index values with a frequency of 10 hertz or less, and preferably with a frequency of 1 hertz or less. The plurality of sensors may be configured to perform measurement of a value for each of a plurality of air quality characteristics with a frequency of 10 hertz or less, and preferably with a frequency of 1 hertz or less.

The fan assembly may further comprise a memory storing the set of intervals corresponding to each of the measured air quality characteristics. The set of intervals corresponding to each of the measured air quality characteristics stored in the memory may vary in size.

Preferably, the fan assembly further comprises at least one filter assembly that is arranged to purify the airflow before the airflow is emitted from the fan assembly. The fan assembly may further comprise an air inlet through which an airflow is drawn into the fan assembly by the motor-driven impeller. The at least one filter assembly may then be mounted over the air inlet. The fan assembly may further comprise a further air inlet through which a further airflow is drawn into the fan assembly and into contact with the plurality of sensors. The fan assembly may comprise a nozzle mounted on a fan body, the motor-driven impeller being housed within the fan body, the air outlet being provided by the nozzle, and the nozzle being arranged to receive the airflow from the fan body and to emit the airflow from the air outlet. The plurality of sensors may be housed within the fan body and the fan body may then comprise both the air inlet and the further air inlet. The nozzle may comprise a base that connects to an upper end of the fan body and the plurality of sensors are enclosed within the base of the nozzle. The fan body may then comprise the air inlet and base of the nozzle comprise the further air inlet.

According to a second aspect there is provided a computer implemented method of generating a display providing an indication of air quality. The method comprises using a plurality of sensors to measure a value for each of a plurality of air quality characteristics of sampled air or a sampled flow of air, and using a processor to, for each of the measured air quality characteristics, identify one of a corresponding set of intervals within which the measured value falls and select an air quality index value associated with the identified interval, identify the highest of the selected air quality index values as a current overall air quality index value, and generate on a display a time series plot of the current overall air quality index value and a number of preceding overall air quality index values.

The method may further comprise using the selected air quality index values to set a speed of the motor-driven impeller. The method may then further comprise, for each of the measured air quality characteristics, generating a corresponding speed index value using the selected air quality index value, and setting a speed of the motor-driven impeller in dependence upon the highest of the speed index values The plurality of air quality characteristics may comprise any of a concentration of $PM_{2.5}$ particles, a concentration of $PM_{10}$ particles, a concentration of volatile organic compounds, a concentration of nitrogen dioxide, a concentration sulphur dioxide, and a concentration of ozone.

The plurality sensors may comprise one or more particulate sensors, and one or more gas sensors. The one or more particulate sensors may then measure a value indicative of a concentration of particles with a diameter that is 2.5 µm or less and measure a value indicative of a concentration of particles with a diameter that is 10 µm or less. Alternatively, the one or more particulate sensors may then measure a value indicative of a concentration of particles with a median aerodynamic diameter of less than 2.5 µm and measure a value indicative of a concentration of particles with a median aerodynamic diameter of less than 10 µm. The one or more gas sensors may measure a value indicative of each of a concentration of volatile organic compounds and a concentration of nitrogen dioxide.

The step of generating on a display a time series plot of the current overall air quality index value and a number of preceding overall air quality index values may comprise, for each of the current overall air quality index value and a number of preceding overall air quality index values, generating a component on the display representing the overall air quality index value within the time series plot. The method may then further comprise, for each of the current overall air quality index value and a number of preceding overall air quality index values, identifying one of a corresponding plurality of intervals within which the overall air quality index value falls, selecting a colour associated with the identified interval, and generating the component representing the air quality index value of the time series plot on the display using the selected colour.

The step of causing the display to display a time series plot of the current overall air quality index value and a number of preceding overall air quality index values may be performed with a frequency of 10 hertz or less, and preferably with a frequency of 1 hertz or less. The plurality of sensors may perform measurement of a value for each of a plurality of air quality characteristics with a frequency of 10 hertz or less, and preferably with a frequency of 1 hertz or less.

BRIEF DESCRIPTION OF THE FIGURES

An embodiment of the present invention will now be described, by way of example only, with reference to the accompanying drawings, in which:

FIG. 4a is a front view of an embodiment of a fan assembly;

FIG. 4b is a left side view of the fan assembly of FIG. 4a;

FIG. 5 is a right side cross-section view, taken along line A-A in FIG. 4a;

FIG. 9b is a rear perspective view of a perforated shroud suitable for use with the filter assembly of FIG. 9a;

DETAILED DESCRIPTION OF THE DISCLOSURE

There will now be described a fan assembly that displays to the user an indication of the quality of the ambient air that is an instantly and continuously updated during operation of the fan assembly and thereby provides that the user can determine if the current operational settings of the fan assembly are appropriate. The term "fan assembly" as used herein refers to a fan assembly configured to generate and deliver an airflow for the purposes of thermal comfort and/or environmental or climate control and particularly, but not exclusively, to a domestic fan for creating air circulation and air current in a room, in an office or other domestic environment. Such a fan assembly may be capable of generating one or more of a dehumidified airflow, a humidified airflow, a purified airflow, a filtered airflow, a cooled airflow, and a heated airflow.

Figure 1:
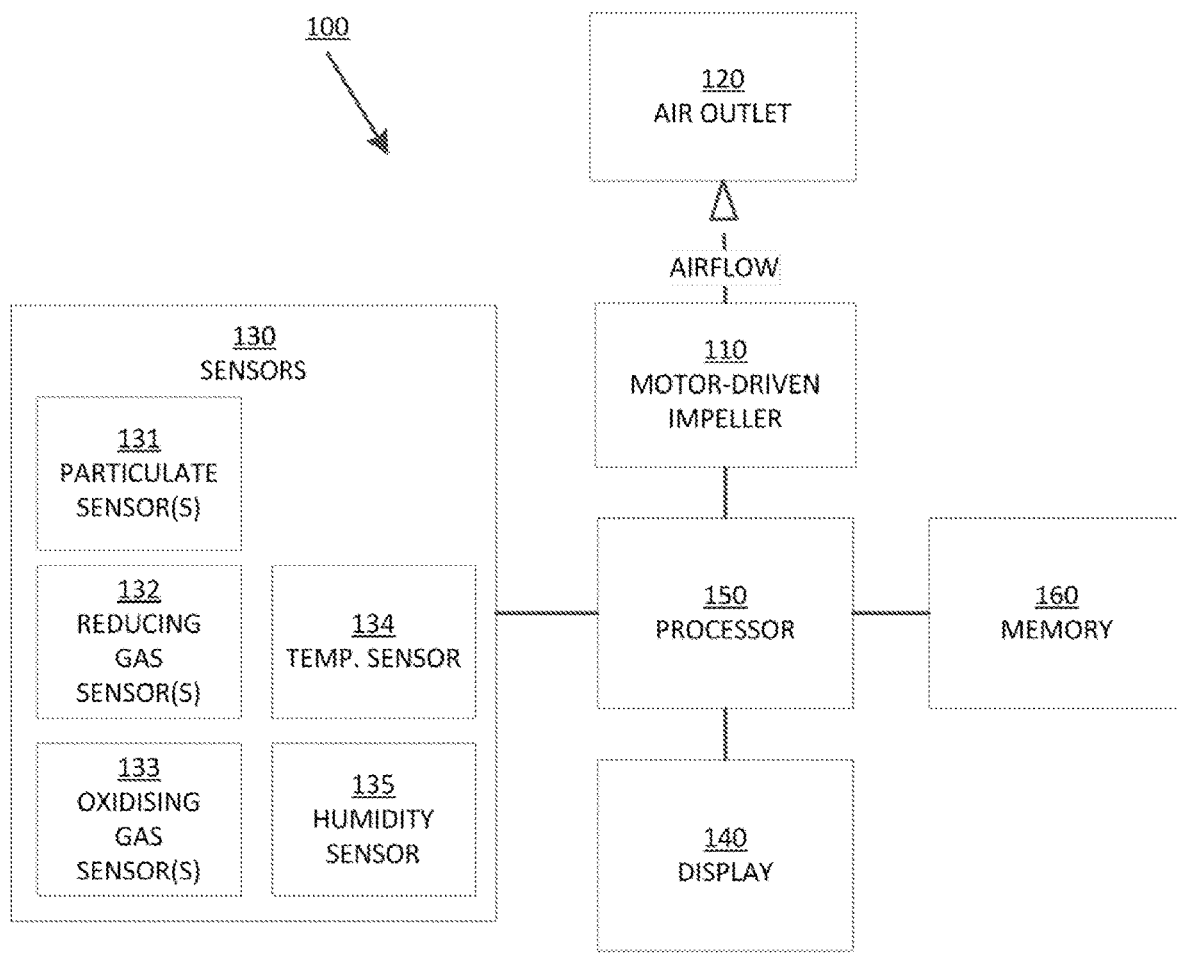
FIG. 1 illustrates schematically an embodiment of a fan assembly suitable for implementing the methods described herein.

FIG. 1 illustrates schematically an embodiment of a fan assembly suitable for implementing the methods described herein. The fan assembly 100 is implemented as a combination of mechanical components, computer hardware and software and comprises a motor-driven impeller 110 arranged to generate an airflow, an air outlet 120 arranged to emit the airflow from the fan assembly 100, and a plurality of sensors 131-133 arranged to detect/measure a value for each of a plurality of air quality characteristics/parameters of the ambient air. The fan assembly 100 further comprises an electronic display 140 that is arranged to present data to a user of the fan assembly 100, and a computer processor 150 configured to control the fan assembly 100 and to generate a graphic on the electronic display 140 that provides an indication of the air quality of the ambient air based on the measurements received from the plurality of sensors 131-133.

Figure 2:
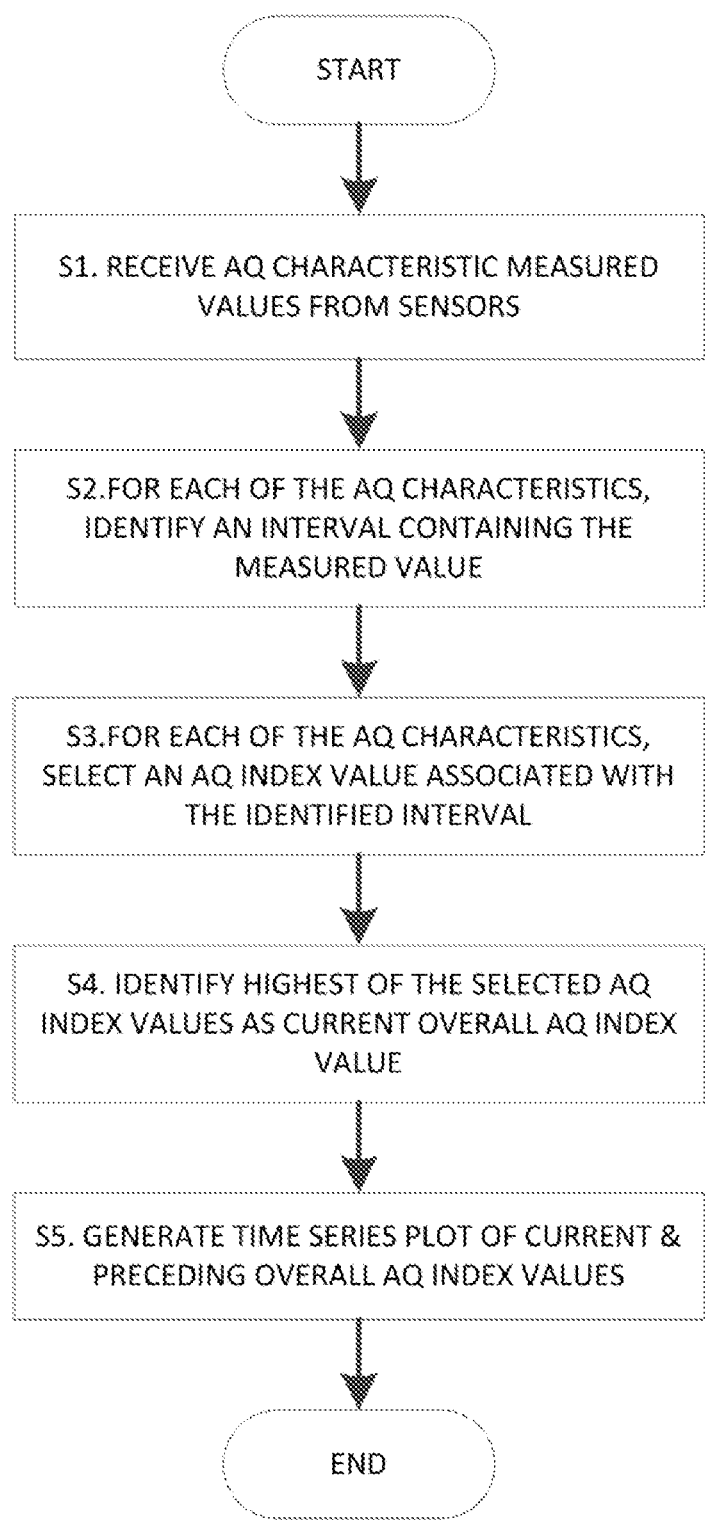
FIG. 2 is a flow diagram illustrating an embodiment of the methods described herein.

In order to generate a graphic on the electronic display 140 that provides an indication of the air quality, the processor 150 is configured to implement a method in which, for each measurement occurrence, the measurements received from the plurality of sensors 131-133 are each converted into an air quality (AQ) index value, with the highest of these air quality index values then being identified as the current overall air quality index value. In this regard, the overall air quality index value is that which is considered to represent the current air quality, and the overall air quality index value could therefore also be referred to as the primary or representative air quality index value. The processor 150 then generates instructions that cause the electronic display 140 to display a time series plot of the current overall air quality index value and a number of preceding overall air quality index values. FIG. 2 is a flow diagram illustrating an embodiment of such a method. The method involves, for each measurement occurrence:

S1. The processor 150 receiving, from the plurality of sensors 131-133, measured values for each of the plurality of air quality characteristics.

S2. The processor 150 then, for each of the plurality of air quality characteristics, identifies one of a corresponding set of ranges/intervals within which the measured value falls/lies.

S3. The processor 150 then, for each of the plurality of air quality characteristics, selects an air quality index value associated with the identified range/interval.

S4. The processor 150 then identifies the largest/highest of the selected air quality index values as a current overall air quality index value.

S5. The processor 150 then causes the electronic display 140 to display a time series plot of the current overall air quality index value and a number of preceding overall air quality index values. In this regard, the current overall air quality index value is that identified for the current measurement occurrence, whilst a preceding overall air quality index value is that identified for a previous measurement occurrence.

As described above, in order to implement this method each of the plurality of air quality characteristics has a corresponding set of ranges/intervals, with each range/interval in the set being associated with a different air quality index value. Each air quality characteristic therefore has a corresponding plurality of consecutive/contiguous ranges/intervals to ensure that a value measured by the corresponding sensor(s) will fall/lie within one and only one of the ranges/intervals in the set, with consecutive ranges/intervals being associated with consecutive air quality index values. By way of example, the table below illustrates an example of a set of ranges and associated air quality index values for one air quality characteristic.

| AQ Characteristic | | |
|---|---|---|
| AQ Index Value | Measured Value Lower Limit | Measured Value Upper Limit |
| 0 | 0 | 11 |
| 1 | 12 | 20 |
| 2 | 21 | 28 |
| 3 | 29 | 35 |
| 4 | 36 | 42 |
| 5 | 43 | 48 |
| 6 | 49 | 53 |
| 7 | 54 | 62 |
| 8 | 63 | 70 |
| 9 | 71 | ≥76 |

It is therefore preferable that fan assembly further comprises a memory 160 configured to store, for each of the air quality characteristics, a set of ranges/intervals and an associated air quality index value for each of the ranges/intervals in the set.

Optionally, for one or more of the plurality of air quality characteristics, the set of ranges/intervals corresponding to the air quality characteristics can vary in size. In this case, at least one of the set of ranges/intervals will be smaller in size than another of the set of ranges/intervals. For example, in the table given above, the first of the set of intervals has a size of 12, the second of the set of intervals has a size of 9, the third of the set of intervals has a size of 7 etc.

The air quality characteristics that are measured by the plurality of sensors 131-133 preferably comprise levels of potential air pollutants present in the ambient air. For example, these air quality characteristics may comprise any of a concentration of $PM_{2.5}$ particles, a concentration of $PM_{10}$ particles, a concentration of volatile organic compounds, a concentration of nitrogen dioxide, a concentration sulphur dioxide, and a concentration of ozone. The plurality of sensors therefore preferably comprises one or more particulate sensors 131 and one or more gas sensors 132, 133.

The term "PM", or particulate matter, as used herein refers to condensed phase (solid or liquid) particles suspended in the atmosphere. The term "$PM_{2.5}$", also known as fine particulate matter, is typically used to refer to particles with a diameter that is generally 2.5 μm or less, and the term "$PM_{10}$" is typically used to refer to particles with a diameter that is generally 10 μm or less. However, the International Organization for Standardization (ISO) defines $PM_{2.5}$ as particles which pass through a size-selective inlet with a 50% efficiency cut-off at 2.5 μm aerodynamic diameter and $PM_{10}$ as particles which pass through a size-selective inlet with a 50% efficiency cut-off at 10 μm. $PM_{2.5}$ can therefore also be used to refer to particles with a median aerodynamic diameter of less than 2.5 μm, and $PM_{10}$ to particles with a median aerodynamic diameter of less than 10 μm.

The one or more particulate sensors 131 can therefore be arranged to measure a value indicative of a mass concentration for particles with a diameter of 2.5 μm or less and to measure a value indicative of a mass concentration for particles with a diameter of between 2.5 and 10 μm. Alternatively, the one or more particulate sensors 131 could be arranged to measure a value indicative of each of a mass concentration of particles with a median diameter of 2.5 μm and to measure a value indicative of a mass concentration of particles with a median diameter of 10 μm.

The one or more gas sensors 132, 133 could then be arranged to measure a value indicative of each of a concentration of volatile organic compounds and a concentration of nitrogen dioxide. In addition, the one or more gas sensors 132, 133 could be further arranged to measure a value indicative of one or each of a concentration sulphur dioxide and a concentration of ozone. For example, the one or more gas sensor 132, 133 could comprise a reducing gas sensor 132 and an oxidising sensor 133. The reducing gas sensor 132 would preferably be configured to provide/output a value indicative of a concentration of volatile organic compounds and the oxidising sensor 133 would preferably be configured to provide/output a value indicative of a concentration of nitrogen dioxide. Optionally, the fan assembly may also further comprise any of a temperature sensor 134 and a humidity sensor 135.

In order to cause the electronic display 140 to display a time series plot of the current overall air quality index value and a number of preceding overall air quality index values, the processor 150 could be configured to, for each of the preceding overall air quality index values and the current overall air quality index value, generate a segment, section or point on the display 140 representing the overall air quality index value within the time series plot. For example, the segment, section or point generated on the electronic display 140 can comprise one or more pixels of the display 140 that form a portion of the time series plot that represents the corresponding overall air quality index value. In addition, the processor 150 could be further configured to, for each of the preceding overall air quality index values and the current overall air quality index value, identify one of a corresponding plurality of ranges/intervals that contain/include the overall air quality index value, select a colour associated with the identified range/interval, and generate the segment, section or point representing the overall air quality index value within the time series plot on the display 140 using the selected colour. These ranges/intervals will therefore be consecutive/contiguous ranges/intervals of possible overall air quality index values, with each range/interval being associated with a different colour. By way of example, the associated colours could be defined using one or more colour model values that are associated with a particular colour model such as RGB or CMYK. It is therefore preferable that fan assembly 100 further comprises a memory 160 configured to store a set of ranges/intervals for the overall air quality index and an associated colour for each of the ranges/intervals in the set.

Preferably, the processor 150 would be configured to repeat/perform the step of causing the display to display a time series plot of the current overall air quality index value and a number of preceding overall air quality index values with a frequency of 10 hertz or less, and preferably with a frequency of 1 hertz or less. Consequently, the plurality of sensors 131-133 are preferably configured to repeat/perform measurement of a value for each of a plurality of air quality characteristics with a frequency of 10 hertz or less, and preferably with a frequency of 1 hertz or less.

In addition to generating graphics on the electronic display 140, the processor 150 may be further configured to use the selected air quality index values to select/set a speed of the motor-driven impeller 110. For example, the processor 150 may be configured to, for each of the measured air quality characteristics, generate a corresponding speed index value using the selected air quality index value, and select/set a speed of the motor-driven impeller 110 based/in dependence upon the highest/largest of the speed index values In a preferred embodiment the fan assembly is an air purifying fan assembly. In this case, the fan assembly would comprise at least one filter assembly that is arranged to purify the airflow before the airflow is emitted from the fan assembly. Preferably, the fan assembly would then further comprise an air inlet through which air is drawn into the fan assembly by the motor-driven impeller, with the at least one filter assembly being mounted over the air inlet. The fan assembly may then also comprise a separate further air inlet through which air is drawn into the fan assembly and into contact with the plurality of sensors.

Figures 4A, 4B:
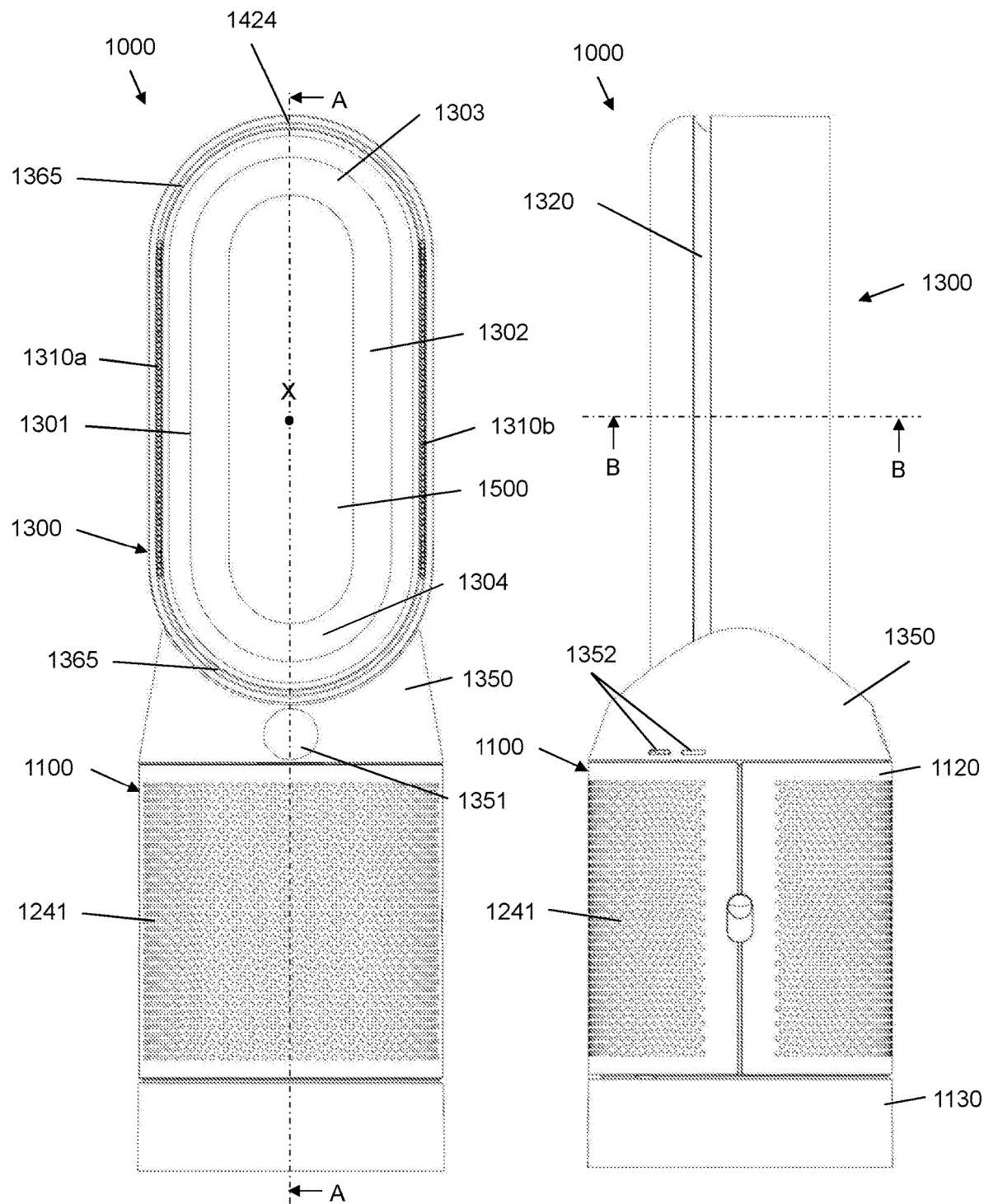
Figure 5:
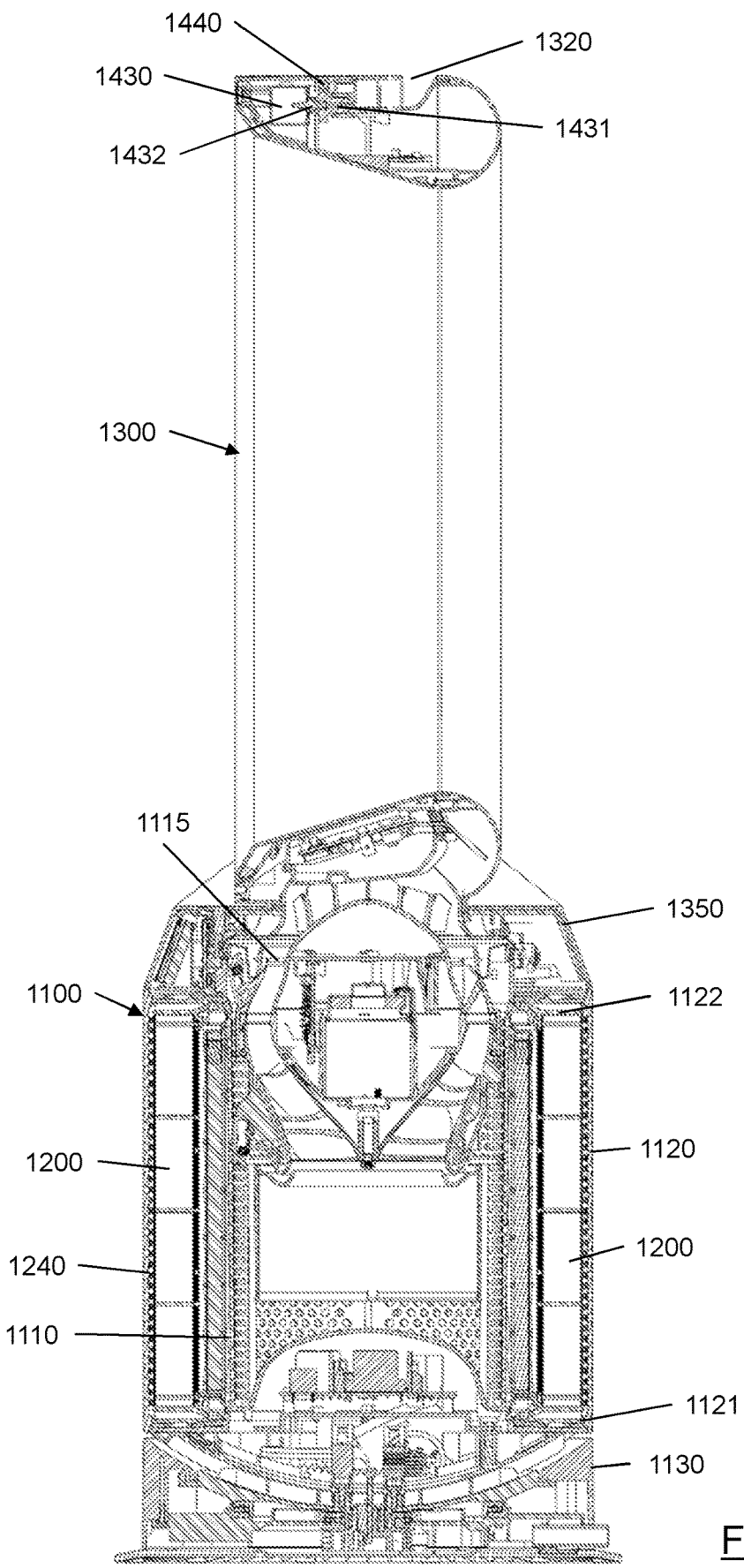
Figure 6:
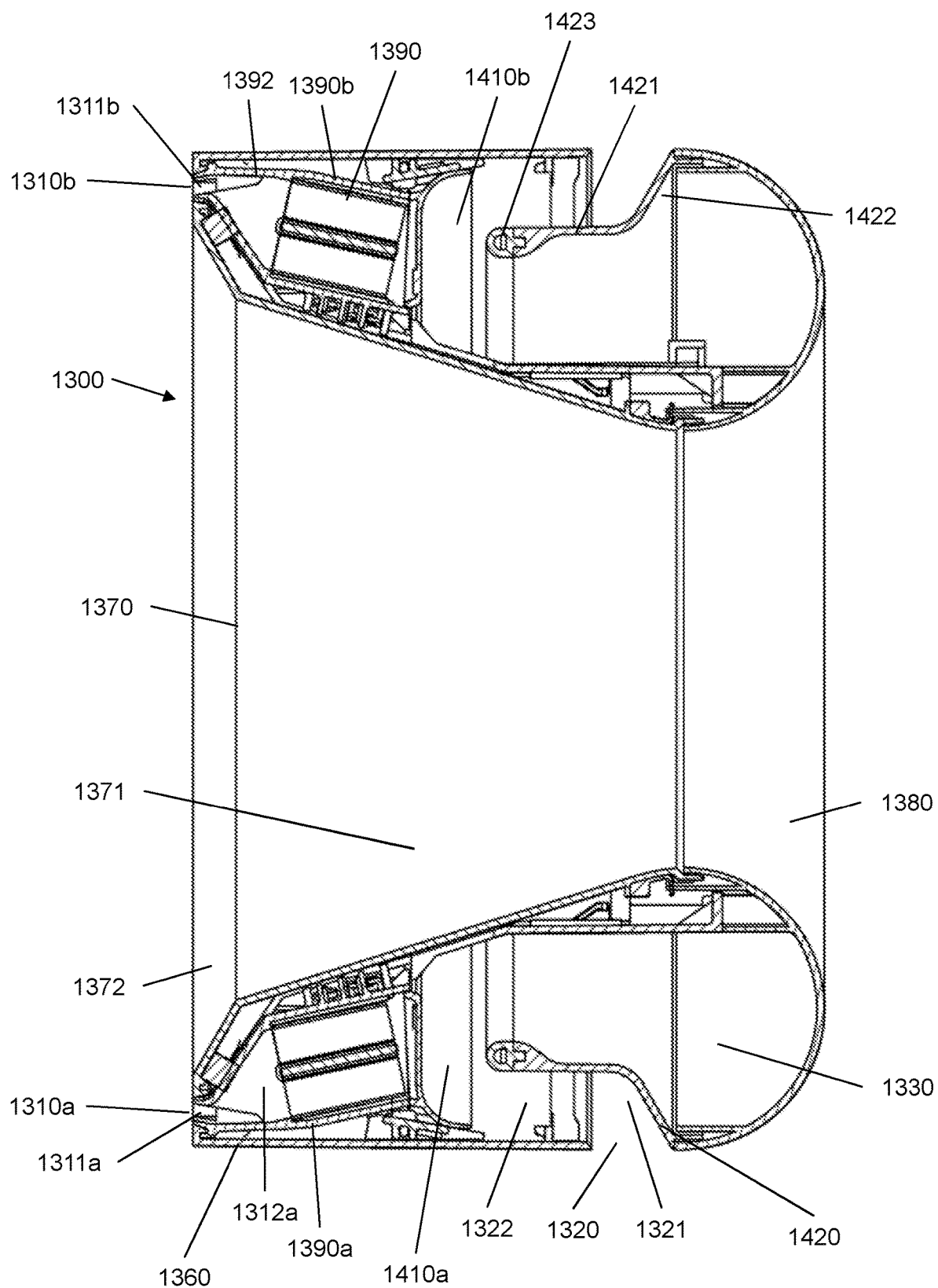
FIG. 6 is a cross-sectional view through the nozzle of the fan assembly, taken along line B-B in FIG. 4b.
Figure 7:
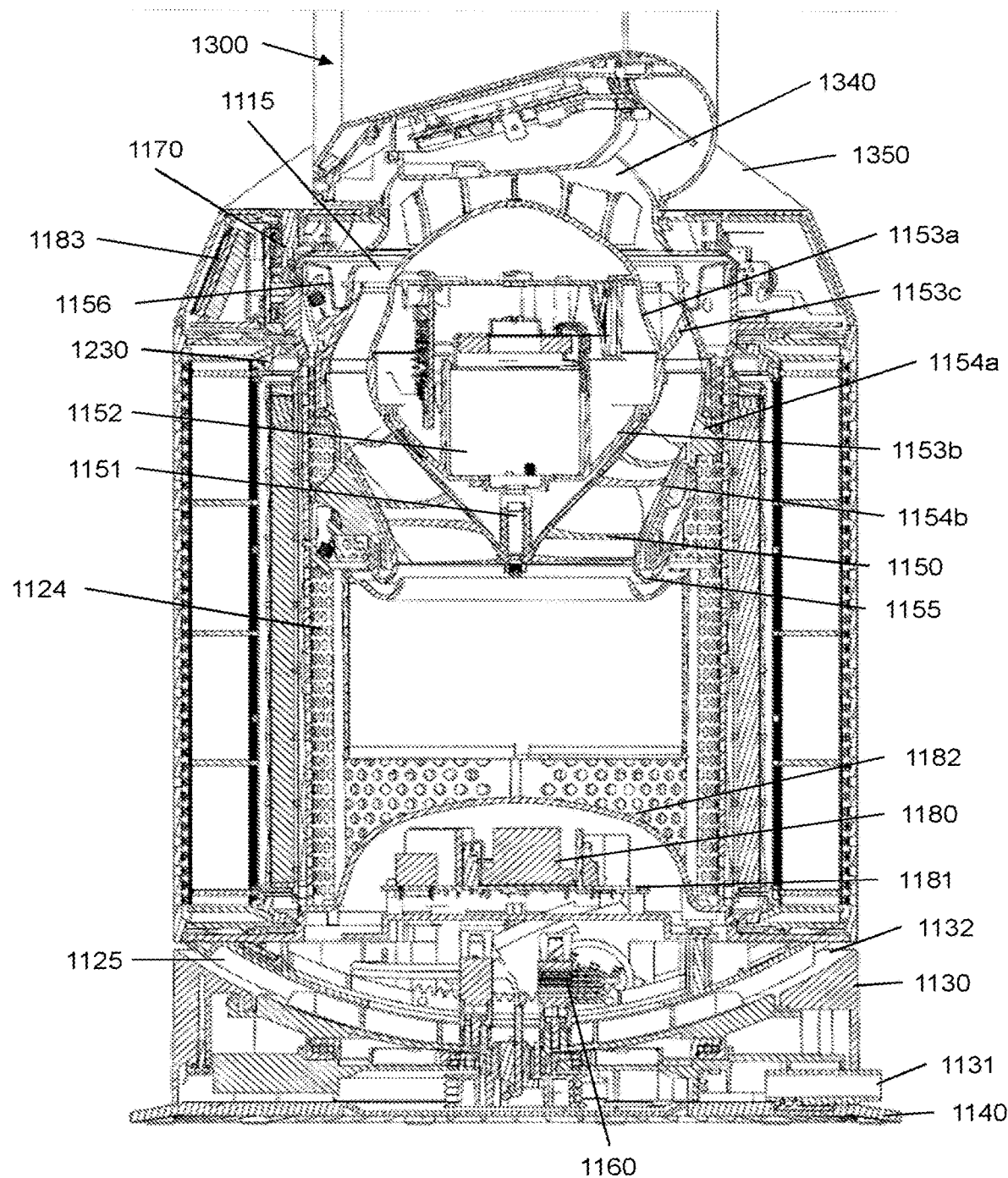
FIG. 7 then shows an enlarged view of a portion of the cross-section view of FIG. 5.

FIGS. 4a to 11 therefore illustrate an embodiment of a free-standing, air purifying fan assembly 1000. FIGS. 4a and 4b are external views of the fan assembly 1000, and FIGS. 5 and 6 show sectional views through lines A-A and B-B of FIGS. 4a and 4b respectively. FIG. 7 then shows an enlarged sectional view of the body 1100 of the fan assembly 1000.

The fan assembly 1000 comprises a body or stand 1100 comprising an air inlet 1110 through which a primary airflow enters the body 1100, at least one removable purifying/filter assembly 1200 mounted on the body 1100 over the air inlet 1110, and a nozzle 1300 mounted on an air vent/opening 1115 through which the primary airflow exits the body 1100.

In the illustrated embodiment, the nozzle 1300 comprises a first air outlet 1310 for emitting the primary airflow from the fan assembly 1000, a second air outlet 1320 for emitting the primary airflow from the fan assembly 1000, and a valve 1400 that is arranged to direct the primary airflow to one or both of the first air outlet 1310 and the second air outlet 1320 in dependence upon the position of a valve member 1410 of the valve 1400.

The nozzle 1300 comprises an interior passage 1330 for conveying air from an air inlet 1340 of the nozzle 1300 to one or both of the first air outlet 1310 and the second air outlet 1320. The nozzle 1300 also defines a central/inner opening/bore 1500 through which air from outside the fan assembly 1000 is drawn by the primary airflow emitted from the first outlet 1310 and which combines with the emitted airflow to produce an amplified airflow. The nozzle 1300 therefore forms a loop that extends around and surrounds the bore 1500.

The second air outlet 1320 of the nozzle 1300 is arranged to receive the airflow from the interior passage 1330 and to emit the airflow without drawing air from outside the fan assembly through the opening/bore 1500 defined by the nozzle 1300, thereby producing a non-amplified airflow. In the illustrated embodiment, the second air outlet 1320 is arranged to direct the emitted the airflow such that it substantially radiates/divaricates away from the fan assembly 1000. In particular, the second air outlet 1320 is arranged to direct the non-amplified airflow such that it substantially radiates/divaricates away from a central axis (X) of the opening/bore 1500 defined by the nozzle 1300, i.e. at an angle of between 30 degrees and 150 degrees away from the central axis (X) of the opening/bore 1500 defined by the nozzle 1300. Preferably, the second air outlet 1320 is arranged to direct the non-amplified airflow substantially perpendicularly away from the central axis (X) of the opening/bore 1500 defined by the nozzle 1300, i.e. at an angle from 45 to 135 degrees away from the central axis (X) of the opening/bore 1500 defined by the nozzle 1300, and more preferably at an angle from 70 to 110 degrees from the central axis (X) of the opening/bore 1500 defined by the nozzle 1300. The second air outlet 1320 would therefore be arranged to direct the non-amplified airflow in a direction that is substantially perpendicular to the direction in which air is drawn through the bore 1500.

As shown in FIGS. 5 and 7, the body 1100 comprises a substantially cylindrical main body section 1120 mounted on a substantially cylindrical lower body section 1130. The main body section 1120 has a smaller external diameter than the lower body section 1130. The main body section 1120 has a lower annular flange 1121 that extends radially/perpendicularly away from the lower end of the main body section 1120. The outer edge of the lower annular flange 1121 is substantially flush with the external surface of the lower body section 1130. The removable purifying/filter assemblies 1200 are then mounted on the main body section 1120, resting on the lower annular flange 1121 of the main body section 1120. The main body section 1120 further comprises an upper annular flange 1122 that extends radially/perpendicularly away from an opposite, upper end of the main body section 1120. The outer edge of the upper annular flange 1122 is then substantially flush with the external surface of a base/neck 1350 of the nozzle 1300 that connects to upper end of the main body section 1120.

Figure 8A:
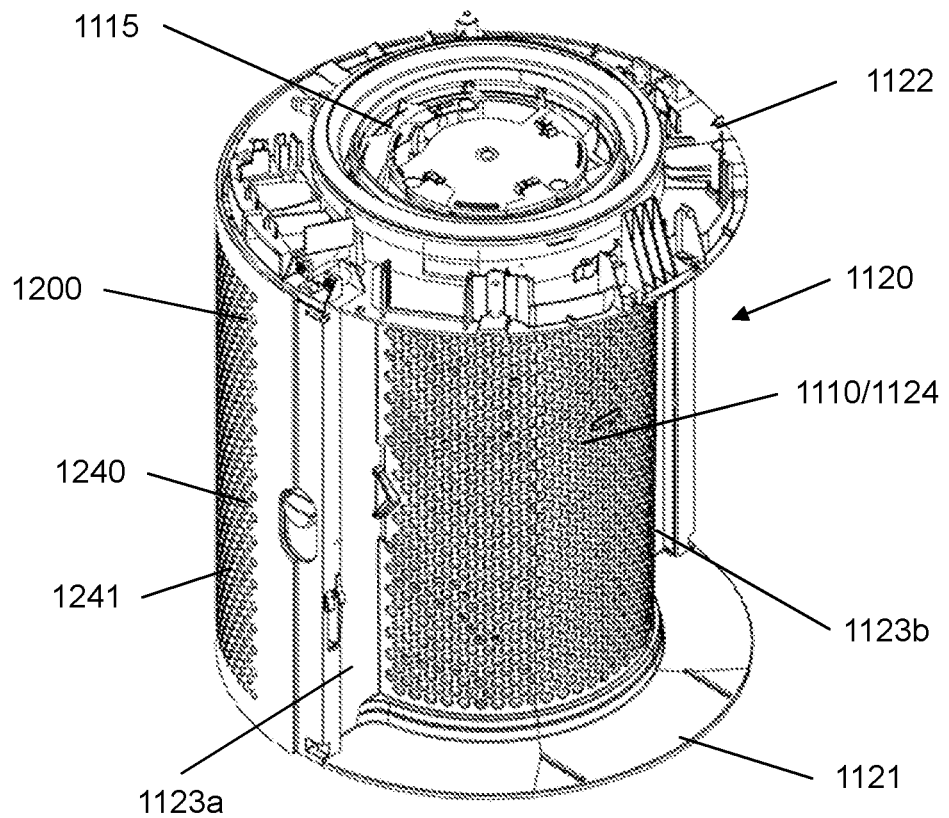
FIGS. 8a and 8b are perspective views of a main body section of the fan assembly of FIGS. 4a and 4b.

The fan assembly 1000 comprises two separate purifying assemblies 1200a, 1200b that are configured to be located on and cover two opposing halves of the main body section 1120. Each purifying assembly 1200 therefore substantially has the shape of a half cylinder/tube that can therefore be located concentrically over the main body section 1120, resting on the lower annular flange 1121 of the main body section 1120. Accordingly, FIG. 8a shows the main body section 1120 with one of the purifying assemblies 1200a removed and with the other of the purifying assemblies 1200b mounted on the far side of the main body section 1120.

Figure 9B:
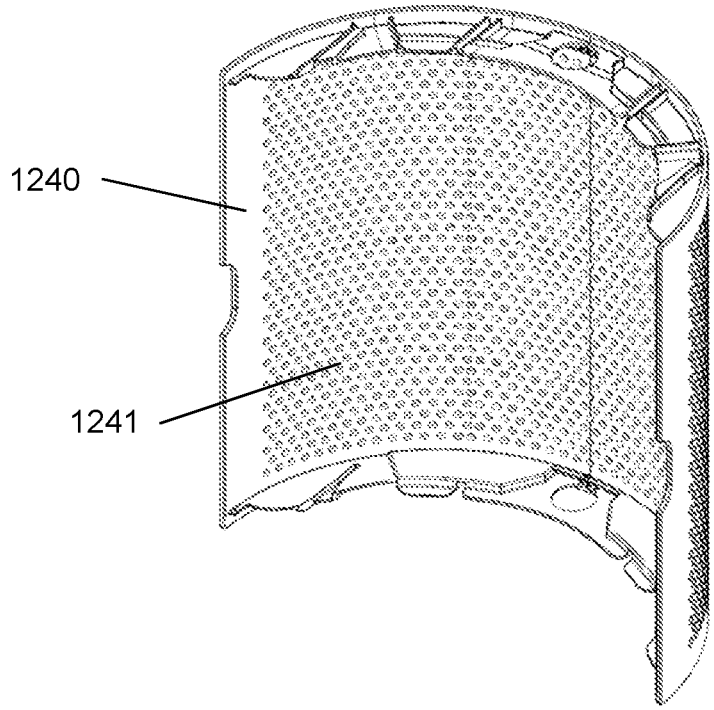
Figure 8B:
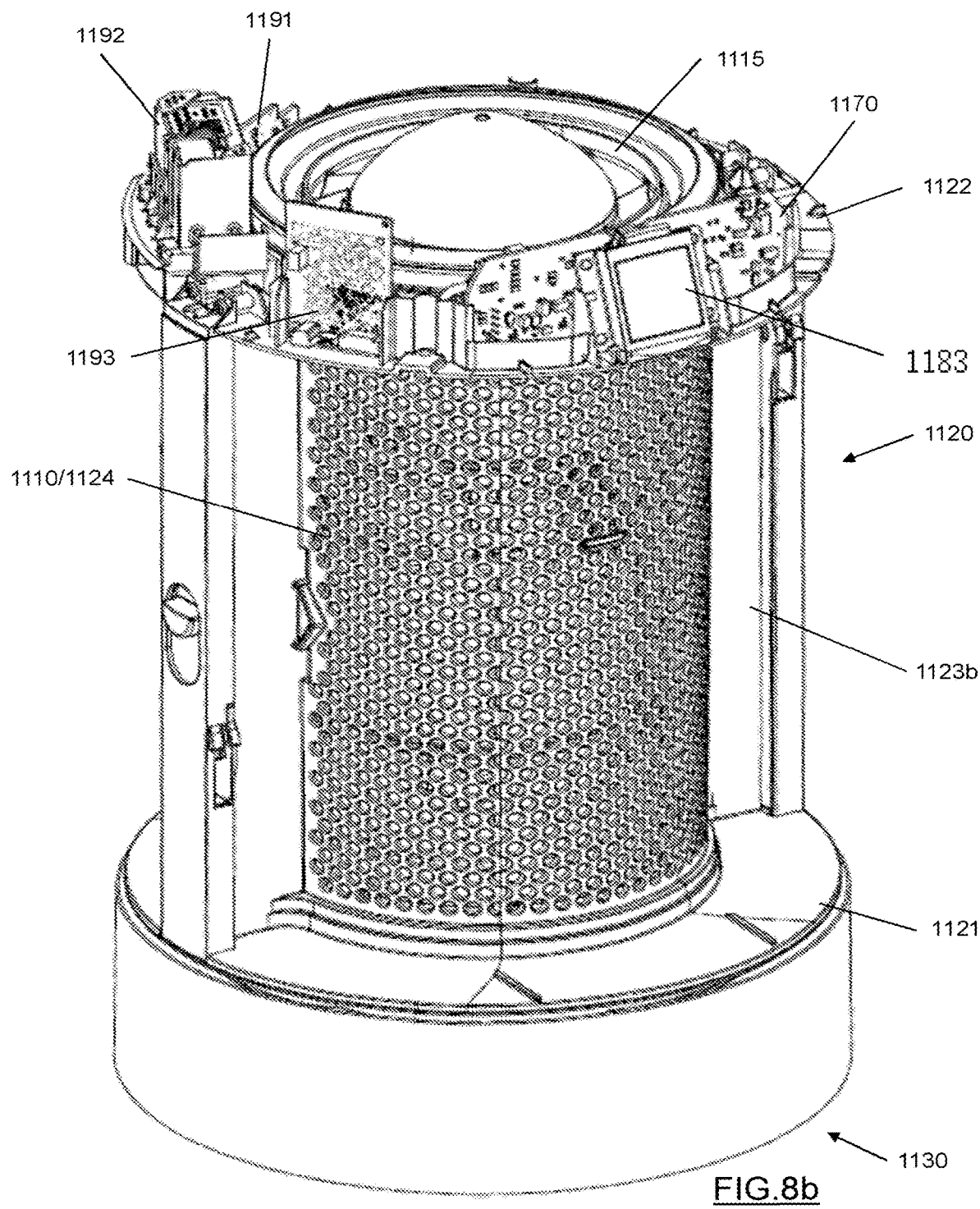
Figure 9A:
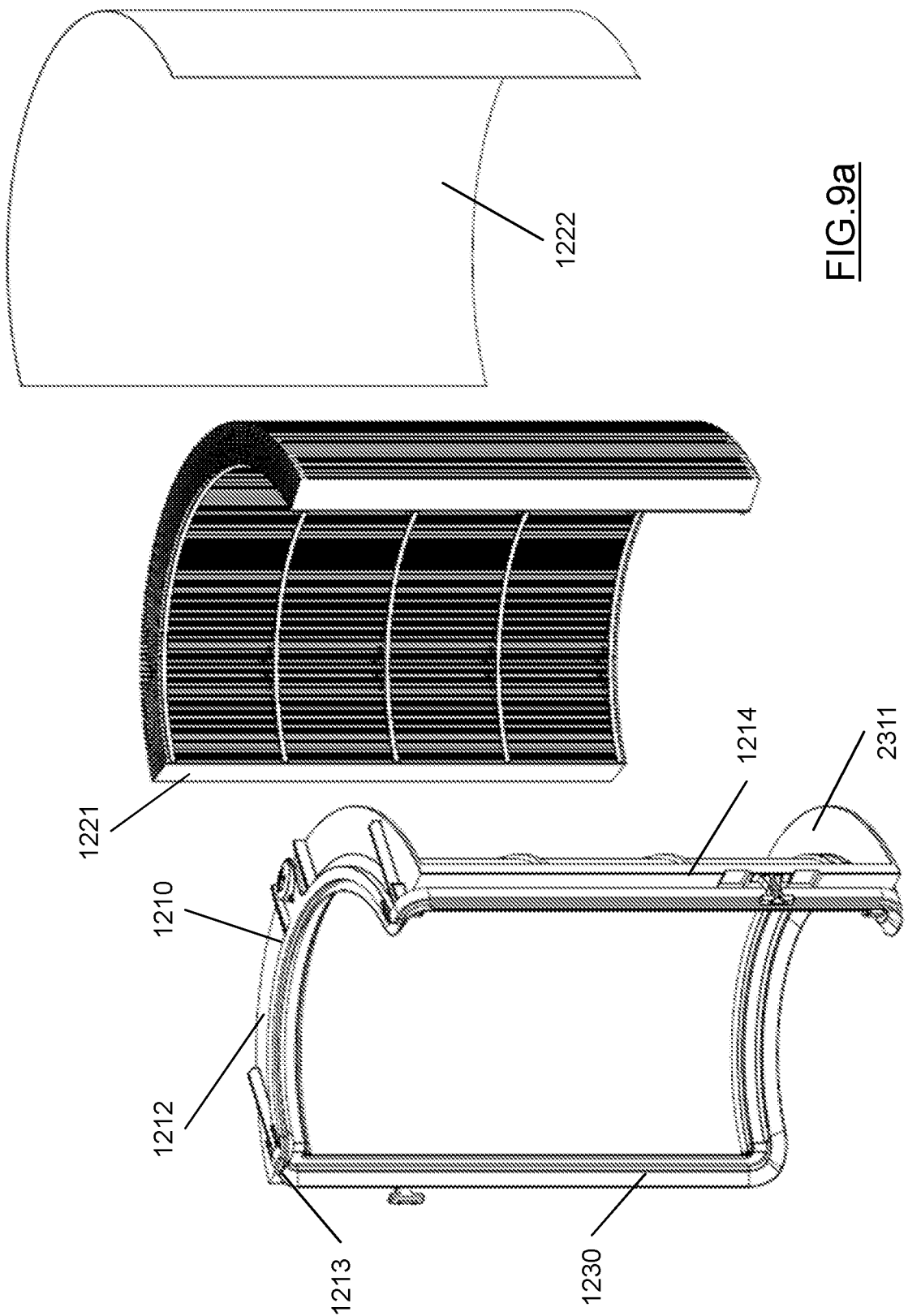
FIG. 9a is an exploded view of the filter assembly of the fan assembly of FIGS. 4a and 4b.

FIG. 9a illustrates an exploded view of an embodiment of a filter assembly 1200 suitable for use with the fan assembly of FIGS. 4a to 8b. In this embodiment, each filter assembly 1200 comprises a filter frame 1210 that supports one or more filter media. Each filter frame 1210 substantially has the shape of a semi-cylinder with two straight sides that are parallel to the longitudinal axis of the filter frame 1210 and two curved ends that are perpendicular to the longitudinal axis of the filter frame 1210. The one or more filter media are arranged so as to cover the surface area defined by the filter frame 1210.

The filter frame 1210 is provided with a first end flange 1211 that extends radially/perpendicularly away from a first curved end of the filter frame 1210 and a second end flange 1212 that extends radially/perpendicularly away from an opposite, second curved end of the filter frame 1210. Each filter frame 1210 is then also provided with a first side flange 1213 that extends perpendicularly away from a first side of the filter frame 1210, from a first end of the first end flange 1211 to a first end of the second end flange 1212, and a second side flange 1214 that extends perpendicularly away from a second side of the filter frame 1210, from a second end of the first end flange 1211 to a second end of the second end flange 1212. The first end flange 1211, second end flange 1212, first side flange 1213 and second side flange 1214 are integrally formed with one another to thereby form a ridge or rim that extends around the entire periphery of the filter frame 1210. The flanges 1211-1214 provide surfaces to which the filter media can be sealed (e.g. using glue on the downstream side of filter assembly 1210) and also provide surfaces that allow the filter frame 1210 to form a seal with the main body 1120 of the fan assembly 1000 (e.g. with corresponding flanges on the main body section 1120) to prevent air from leaking into or out of the fan body 1100 without passing through the filter media.

Each filter assembly 1200 further comprises a flexible seal 1230 provided around the entirety of an inner periphery of the filter frame 1210 for engaging with the main body section 1120 to prevent air from passing around the edges of the filter assembly 1200 to the air inlet 1110 of the main body section 1120. The flexible filter seal 1230 preferably comprises lower and upper curved seal sections that substantially take the form of an arc-shaped wiper or lip seal, with the each end of the lower seal section being connected to a corresponding end of the upper seal section by two straight seal sections that each substantially take the form of a wiper or lip seal. The upper and lower curved seal sections are therefore arranged to contact the curved upper and lower ends of the main body section 1120, whilst the straight seal sections are arranged to contact one or other of two diametrically opposed, longitudinal flanges 1123a, 1123b that extend perpendicularly away from the main body section 1120. Preferably, the filter frame 1210 is provided with a recess (not shown) that extends around the entirety of the inner periphery of the filter frame 1210 and that is arranged to receive and support the seal 1230. In the illustrated embodiment, this recess extends across an inner surface of both the first side flange 1213 and second side flange 1214, and across an inner edge of both the first end and the second end of the filter frame 1210.

One or more filter media 1221, 1222 are then supported on the outer, convex face of the filter frame 1210, extending across the area between the first and second flanges 1211, 1212 and the first second side flanges 1213, 1214. In the illustrated embodiment, each filter assembly 1200a, 1200b comprises a particulate filter media layer 1221 covered with an outer mesh layer 1222 attached on the outer face of the filter frame 1210. Optionally, one or more further filter media can then be located within the inner, concave face of the filter frame 1210. For example, these further filter media could comprise a first chemical filter media layer covered by a second chemical filter media layer that are both located within the inner face of the filter frame 1210. These further filter media could either be attached to and/or support on the inner, concave face of the filter frame 1210 or alternatively could be mounted on to the main body section 1120, resting on the lower annular flange 1111 of the main body section 1120 beneath each filter assembly 1200a, 1200b. In either case, the filter frame 1210 will be formed so that it defines a space within the inner, concave face of the filter frame 1210 within which these further filter media can be accommodated when the filter assembly 1200 is mounted onto the main body section 1120.

As shown in FIG. 8a, a perforated shroud 1240 that is substantially in the shape of a half cylinder is then attached concentrically to the filter frame 1210 so as to cover the purifying assemblies 1200 when located on the main body section 1120. FIG. 9b illustrates a rear perspective view of a perforated shroud 1240 suitable for use with the fan assembly of FIGS. 4a to 8b. The perforated shrouds 1240 each comprise an array of apertures which act as an air inlet 1241 of the purifying assembly 1200 in use of the fan 1000. Alternatively, the air inlet 1241 of the shroud 1240 may comprise one or more grilles or meshes mounted within windows in the shroud 1240. It will also be clear that alternative patterns of air inlet arrays are envisaged within the scope of the present invention. The shrouds 1240 protect the filter media 1221-1224 from damage, for example during transit, and also provides a visually appealing outer surface for the purifying assemblies 1200, which is in keeping with the overall appearance of the fan assembly 1000. As the shroud 1240 defines the air inlet 1241 for the purifying assembly 1200, the array of apertures are sized to prevent larger particles from entering the purifying assembly 1200 and blocking, or otherwise damaging, the filter media 1221-1224.

The main body section 1120 comprises a perforated housing 1124 that contains various components of the fan assembly 1000. The perforated housing 1124 comprises the array of apertures which act as the air inlet 1110 of the body 1100 of the fan assembly 1000. The purifying assemblies 1200 are then located upstream from the air inlets 1110 of the main body section 1120, such that the air drawn into the main body section 1120 by the impeller 1150 is filtered prior to entering the main body section 1120. This serves to remove any particles which could potentially cause damage to the fan assembly 1000, and also ensures that the air emitted from the nozzle 1300 is free from particulates. In addition, this also serves to remove various chemical substances from that could potentially be a health hazard so that the air emitted from the nozzle 1300 is purified. In this embodiment the air inlets 1110 comprise an array of apertures formed in the main body section 1120. Alternatively, the air inlets 1110 could comprise one or more grilles or meshes mounted within windows formed in the main body section 1120. The main body section 1120 is open at the upper end thereof to accommodate the air vent/opening 1115 through which the primary airflow is exhausted from the body 1100.

The lower body section 1130 comprises a further housing containing other components of the fan assembly 1000. The lower body section 1130 is mounted on a base 1140 for engaging a surface on which the fan assembly 1000 is located. Specifically, the base 1140 supports the fan assembly 1000 when located on a surface with the nozzle 1300 uppermost relative to the base 1140. The lower body section 1130 houses a pan drive gear (not shown) that is engaged by a pan pinion (not shown). The pan pinion is driven by an oscillation motor 1160 housed within the bottom of the main body section 1120. Rotation of the pan pinion by the oscillation motor 1160 therefore causes the main body section 1120 to rotate relative to the lower body section

1130. A mains power cable (not shown) for supplying electrical power to the fan assembly 1000 extends through an aperture 1131 formed in the lower body section 1130. The external end of the cable is then connected to a plug for connection to a mains power supply.

The main body section 1120 may be tilted relative to the lower body section 1130 to adjust the direction in which the primary airflow is emitted from the fan assembly 1000. For example, the upper surface 1132 of the lower body section 1130 and the lower surface 1125 of the main body section 1120 may be provided with interconnecting features which allow the main body section 1120 to move relative to the lower body section 1130 while preventing the main body section 1120 from being lifted from the lower body section 1130. For example, the lower body section 1130 and the main body section 1120 may comprise interlocking L-shaped members. In this embodiment, the upper surface 1132 of the lower body section 1130 is concave and the lower surface 1125 of the main body section 1120 is correspondingly convex. At least a portion of the two surfaces will therefore remain adjacent to one another, and the interconnecting features will remain at least partially connected, when the main body section 1120 is tilted relative to the lower body section 1130.

As described above, the main body section 1120 houses the oscillation motor 1160 that drives the pan pinion that is engaged with the pan drive gear within the lower body section 1130. In the illustrated embodiment, the oscillation motor 1160 is housed within the bottom of the main body section 1120, adjacent to the convex lower surface 1125 of the main body section 1120, as shown in FIG. 7. Together the oscillation motor 126, the pan pinion and the pan drive gear provide an oscillation mechanism for oscillating the main body section 1120 relative to the lower body section 1130. This oscillation mechanism is controlled by a main control circuit 1170 of the fan assembly 1000 in response to control inputs provided by a user.

The mains power cable passes through the lower body section 1130 with the internal end of the mains power cable then being connected to a power supply unit 1180 housed towards the bottom of the main body section 1120. In this embodiment, the power supply unit 1180 is mounted on a power supply mount 1181 that is fixed above the oscillation motor 1160. A power supply cover 1182 is then positioned over the power supply unit 1180 to enclose and protect the power supply unit 1180. In this embodiment, the power supply cover 1182 is substantially dome-shaped to minimize any disturbance of the primary airflow that enters the fan assembly 1000 through the air inlet 1110 and to assist in guiding primary airflow. Optionally, a heat sink (not shown) can be provided on the upper surface of the power supply cover 1182 to assist in dissipating heat generated by the power supply unit 1180. Mounting the heat sink on the upper surface of the power supply cover 1182 locates the heat sink within the path of the primary airflow that enters the body 1100 through the air inlet 1110 such that the primary airflow will further assist in dissipating heat generated by the power supply unit 1180.

The main body section 1120 houses the impeller 1150 for drawing the primary airflow through the air inlet 1110 and into the body 1100. Preferably, the impeller 1150 is in the form of a mixed flow impeller. The impeller 1150 is connected to a rotary shaft 1151 extending outwardly from a motor 1152. In the illustrated embodiment, the motor 1152 is a DC brushless motor having a speed which is variable by the main control circuit 1170 in response to control inputs provided by a user, as shown in FIG. 7. The motor 1152 is housed within a motor bucket 1153 that comprises an upper portion 1153*a* connected to a lower portion 1153*b*. The upper portion 1153*a* of the motor bucket further comprises a diffuser 1153*c* in the form of an annular disc having curved blades.

The motor bucket 1153 is located within, and mounted on, an impeller housing 1154 that is mounted within the main body section 1120. The impeller housing 1154 comprises a generally frusto-conical impeller wall 1154*a* and an impeller shroud 1154*b* located within the impeller wall 1154*a*. The impeller 1150, impeller wall 1154*a* and an impeller shroud 1154*b* are shaped so that the impeller 1150 is in close proximity to, but does not contact, the inner surface of the impeller shroud 1154*b*. A substantially annular inlet member 1155 is then connected to the bottom of the impeller housing 1154 for guiding the primary airflow into the impeller housing 1154. In the illustrated embodiment, the air vent/opening 1115 through which the primary airflow is exhausted from the body 1100 is defined by the upper portion of the motor bucket 1153*a* and the impeller wall 1154*a*, as shown in FIGS. 5, 7, 8*a* and 8*b*.

A flexible sealing member 1156 is attached between the impeller housing 1154 and the main body section 1120. The flexible sealing member 1156 prevents air from passing around the outer surface of the impeller housing 1154 to the inlet member 1155. The sealing member 1156 preferably comprises an annular lip seal, preferably formed from rubber.

As described above, the nozzle 1300 is mounted on the upper end of the main body section 1120 over the air vent 1115 through which the primary airflow exits the body 1100. The nozzle 1300 comprises a neck/base 1350 that connects to upper end of the main body section 1120, and has an open lower end which provides an air inlet 1340 for receiving the primary airflow from the body 1100. The air inlet 1340 of the nozzle 1300 is provided by a circular opening located centrally within the lower end of the base 1350 of the nozzle 1300. The air inlet 1340 of nozzle 1300 aligns with the air vent 1115 of the main body section 1120, with the air vent 1115 being provided by a circular opening located centrally at the upper end of the main body section 1120.

As shown in FIGS. 4*a*, 4*b*, 5 and 7, the base 1350 of the nozzle 1300 has an external surface that tapers inwardly from the lower end of the base 1350, where the base 1350 is attached to the main body section 1120, to the upper end of the base 1350. At the lower end of the base 1350 the external surface of the base 1350 of the nozzle 1300 is then substantially flush with the outer edge of the upper annular flange 1122 of the main body section 1120. The base 1350 therefore comprises a housing that covers/encloses any components of the fan assembly 1000 that are provided on the upper surface 1122 of the main body section 1120.

In the illustrated embodiment, the main control circuit 1170 is mounted on the upper surface of the upper annular flange 1122 that extends radially away from the upper end of the main body section 1120, as shown in FIGS. 7 and 8*b*. The main control circuit 1170 is therefore housed within base 1350 of the nozzle 1300. The main control circuit 1170 comprises a processor and a memory. The memory is configured to store the various programs/algorithms that are implemented by the processor and/or and any other data that may be of use. For example, the data stored by the memory may include, for each of the air quality characteristics, a set of ranges/intervals and an associated air quality index value for each of the ranges/intervals in the set. The data stored by the memory may also include a set of ranges/intervals for the overall air quality index and an associated colour for each of the ranges/intervals in the set. The processor is then configured to perform the processing required to implement the method of generating a display providing an indication of air quality as described herein.

In addition, an electronic display 1183 is also mounted on the upper annular flange 1122 of the main body section 1120 and therefore housed within base 1350 of the nozzle 1300, with the display 1183 being visible through an opening or at least partially transparent window 1351 provided in the base 1350. For example, the electronic display 1183 could be provided by an LCD display that is mounted on the upper annular flange 1122 and aligned with transparent window 1351 provided in the base 1350. The electronic display 1183 is arranged to present data to a user of the fan assembly 1000 and is connected to the main control circuit 1170 so that the processor can generate a graphic on the electronic display 1183 that provides an indication of the air quality of the ambient air.

In addition, a plurality of sensors 1191, 1192 are mounted on the upper surface of the upper annular flange 1122 and consequentially housed within base 1350 of the nozzle 1300. These sensors 1191, 1192 are arranged to detect/measure a value for each of a plurality of air quality characteristics of the ambient air and to send the measures values to the processor provided by the main control circuit 1170. In particular, these sensors 1191, 1192 include one or more particulate sensors 1191 and one or more gas sensors 1192 that are connected to the main control circuit 1170. The base 1350 of the nozzle 1300 is therefore provided with one or more air inlets 1352 through which ambient air is drawn into the fan assembly 1000 and into contact with the plurality of sensors 1191, 1192.

One or more further electronic components 1193 can also mounted on the upper surface of the upper annular flange 1122 and consequentially housed within base 1350 of the nozzle 1300. These additional electronic components 1193 may further comprise one or more wireless communication modules, such as Wi-Fi, Bluetooth etc., and one or more further sensors, such as an infrared sensor, a temperature sensor, a humidity sensor etc., and any associated electronics. Any such additional electronic components would then also be connected to the main control circuit 1170.

In the illustrated embodiment, the nozzle 1300 has an elongate annular shape, often referred to as a stadium shape, and defines an elongate opening 1500 having a height greater than its width. The nozzle 1300 therefore comprises two relatively straight sections 1301, 1302 each adjacent a respective elongate side of the opening 1500, an upper curved section 1303 joining the upper ends of the straight sections 1301, 1302, and a lower curved section 1304 joining the lower ends of the straight sections 1301, 1302.

The nozzle 1300 therefore comprises an elongate annular outer casing section 1360 that is concentric with and extends about an elongate annular inner casing section 1370. In this example, the inner casing section 1360 and the outer casing section 1370 are separate components; however, they could also be integrally formed as a single piece. The nozzle 1300 also has a curved rear casing section 1380 that forms the rear of the nozzle 1300, with an inner end of the curved rear casing section 1380 being connected to a rear end of the inner casing section 1370. In this example, the inner casing section 1370 and the curved rear casing section 1380 are separate components that are connected together, for example, using screws and/or adhesives; however, they could also be integrally formed as a single piece. The curved rear casing section 1380 has a generally elongate annular cross-section perpendicular to the central axis (X) of the inner bore 1500 of the nozzle 1300, and a generally semi-circular cross-section parallel to the central axis (X) of the inner bore 1500 of the nozzle 1300.

The inner casing section 1370 has a generally elongate annular cross-section perpendicular to the central axis (X) of the inner bore 1500 of the nozzle 1300, and extends around and surrounds the inner bore 1500 of the nozzle 1300. In this example, the inner casing section 1370 has a rear portion 1371 and a front portion 1372. The rear portion 1371 is angled outwardly from the rear end of the inner casing section 1372 away from the central axis (X) of the inner bore 1500. The front portion 1372 is also angled outwardly from the rear end of the inner casing section 1370 away from the central axis (X) of the inner bore 1500, but with a greater angle of inclination than that of the rear portion 1371. The front portion 1372 of the inner casing section 1370 therefore tapers towards the front end of the outer casing section 1360, but does not meet the front end of the outer casing section 1360, with the space between the front end of the inner casing section 1370 and the front end of the outer casing section 1360 defining a slot that forms a first air outlet 1310 of the nozzle 1300.

The outer casing section 1360 then extends from the front of the nozzle 1300 towards an outer end of the curved rear casing section 1380, but does not meet the outer end of the curved rear casing section 1380, with the space between a rear end of the outer casing section 1360 and the outer end of the curved rear casing section 1380 defining a slot that forms a second air outlet 1320 of the nozzle 1300.

The outer casing section 1360, inner casing section 1370 and curved rear casing section 1380 therefore define an interior passage 1330 for conveying air from the air inlet 1340 of the nozzle 1300 to one or both of the first air outlet 1310 and the second air outlet 1320. In other words, the interior passage 1330 is bounded by the internal surfaces of the outer casing section 1360, inner casing section 1370 and curved rear casing section 1380. The interior passage 1330 may be considered to comprise first and second sections which each extend in opposite directions about the bore 1500, as the air that enters the nozzle 1300 through the air inlet 1340 will enter the lower curved section 1304 of the nozzle 1300 and be divided into two air streams which each flow into a respective one of the straight sections 1301, 1302 of the nozzle 1300.

The nozzle 1300 further comprises two curved seal members 1365 each for forming a seal between the outer casing section 1360 and the inner casing section 1370 at the top and bottom curved sections 1303, 1304 of the nozzle 1300, so that there is substantially no leakage of air from the curved sections of the interior passage 1330 of the nozzle 1300. The nozzle 1300 therefore comprises two elongate first air outlets 1310*a*, 1310*b* each located on a respective elongate side of the central bore 1500. In this embodiment, the nozzle 1300 is therefore provided with a pair of first air outlets 1310*a*, 1310*b* for emitting the primary airflow that are located on the opposite elongate sides of the nozzle 1300/opening 1500 towards the front of the nozzle 1300.

The nozzle 1300 then further comprises a pair of heater assemblies 1390*a*, 1390*b* within the interior passage 1330, each heater assembly 1390*a*, 1390*b* being adjacent to a respective one of the pair of first air outlets 1310*a*, 1310*b*. Each heater assembly 1390*a*, 1390*b* comprises a plurality of heater elements 1391 supported within a frame 1392, with the frame 1392 then being mounted within the interior passage 1330 of the nozzle 1300 adjacent to the respective first air outlet 1310*a*, 1310*b*. The frame 1392 of each heater assembly 1390*a*, 1390*b* is therefore arranged, when mounted within the interior passage 1330, to direct the airflow through the heating elements 1391 and out of the corresponding first air outlet 1310a, 1310b. To do so, the portion of the frame 1392 that is between the heater elements 1391 and the corresponding first air outlet 1310a, 1310b tapers towards the air outlet, with a narrow end of the frame 1392 being fitted within the corresponding first air outlet 1310a, 1310b provided in the forward facing edge of the nozzle 1300. This tapered portion of the frame 1392 therefore acts as an airflow guide member as it funnels the primary airflow towards the first air outlet 1310a, 1310b and forms the duct 1311 of the first air outlet 1310a, 1310b.

As shown in FIG. 6, each of first air outlets 1310a, 1310b is therefore provided with a corresponding first airflow channel 1312a, 1312b within the interior passage 1330 of the nozzle 1300 that is defined by the frame 1392 of the corresponding heater assembly 1390. The first airflow channels 1312a, 1312b are each arranged to direct the airflow towards the corresponding first air outlet 1310a, 1310b. The air inlet into the first airflow channel 1312a, 1312b, as defined by inner edge of the frame 1392 of the heater assembly 1390, is substantially perpendicular to the central axis (X) of the bore/opening 1500.

In order for the airflow emitted from the pair of first air outlets 1310a, 1310b to draw air from outside the fan assembly 1000 and combine with this air to produce an amplified airflow, the first air outlets 1310a, 1310b are arranged to direct the emitted the airflow in a direction that is substantially parallel to the central axis (X) of the opening/bore 1500 defined by the nozzle 1300, i.e. at an angle from −30 to 30 degrees away from the central axis, preferably at an angle from −20 to 20 degrees away from the central axis, and more preferably at an angle from −10 to 10 degrees away from the central axis. To do so, the first air outlets 1310a, 1310b are arranged such that a duct 1311 of each first air outlet 1310a, 1310b is substantially parallel to the central axis (X) of the opening/bore 1500 defined by the nozzle 1300.

The second air outlet 1320 is then arranged such that a duct 1321 of the second air outlet 1320 is substantially perpendicular relative to the central axis (X) of the opening/bore 1500 defined by the nozzle 1300. As a consequence, the non-amplified airflow emitted from the second air outlet 1320 will be directed substantially perpendicularly away from the central axis (X) of the opening/bore 1500 defined by the nozzle 1300. As illustrated in FIG. 6, the duct 1321 of the second air outlet 1320 extends from the interior passage 1330 that carries the primary airflow received from the body 1100 to the external periphery of the nozzle 1300 in a direction that is substantially perpendicular to the direction of the air drawn through the bore 1500.

In the embodiment illustrated in FIG. 6, a baffle 1420 is provided within the interior passage that defines a second airflow channel 1322 within the interior passage 1330 that is arranged to direct the primary airflow towards the second air outlet 1320. The baffle 1420 extends into the interior passage 1330 from an interior surface of the nozzle 1300 that at least partially defines the interior passage 1330, with the second airflow channel 1322 being a section of the interior passage 1330 that is on one side of the baffle 1420. In particular, the second airflow channel 1322 comprises a section of the interior passage 1330 that is bounded by the baffle 1420 and by a portion of the interior surface of the nozzle 1300 that is adjacent to the second air outlet 1320.

The baffle 1420 is provided by a baffle wall that extends into the interior passage 1330 from the curved rear casing section 1380. The baffle wall 1420 is connected to the outer end of the curved rear casing section 1380 and has a front portion 1421 and a rear portion 1422. The rear portion 1422 of the baffle wall 1420 is angled inwardly from the outer end of the curved rear casing section 1380 towards the central axis (X) of the bore 1500. The front portion 1421 is then angled relative to the rear portion 1422 so that the front portion 1421 is parallel to the outer casing section 1360, with the majority of the front portion 1421 overlapping the outer casing section 1360. The portion of the interior passage 1330 that is located between the front portion 1421 of the baffle wall 1420 and the overlapping portion of the outer casing section 360 therefore forms the second airflow channel 1322 within the interior passage 1330, with the angled rear portion 1422 of the baffle wall 1420 providing the duct 1321 of the second air outlet 1320 that is substantially perpendicular relative to the central axis (X) of the opening/bore 1500 defined by the nozzle 1300. The air inlet into the second airflow channel 1322, as defined by front end of the baffle wall 1421 and the inner surface of the outer casing section 1360, is substantially perpendicular to the central axis (X) of the opening/bore 1500 defined by the nozzle 1300.

Figure 3:
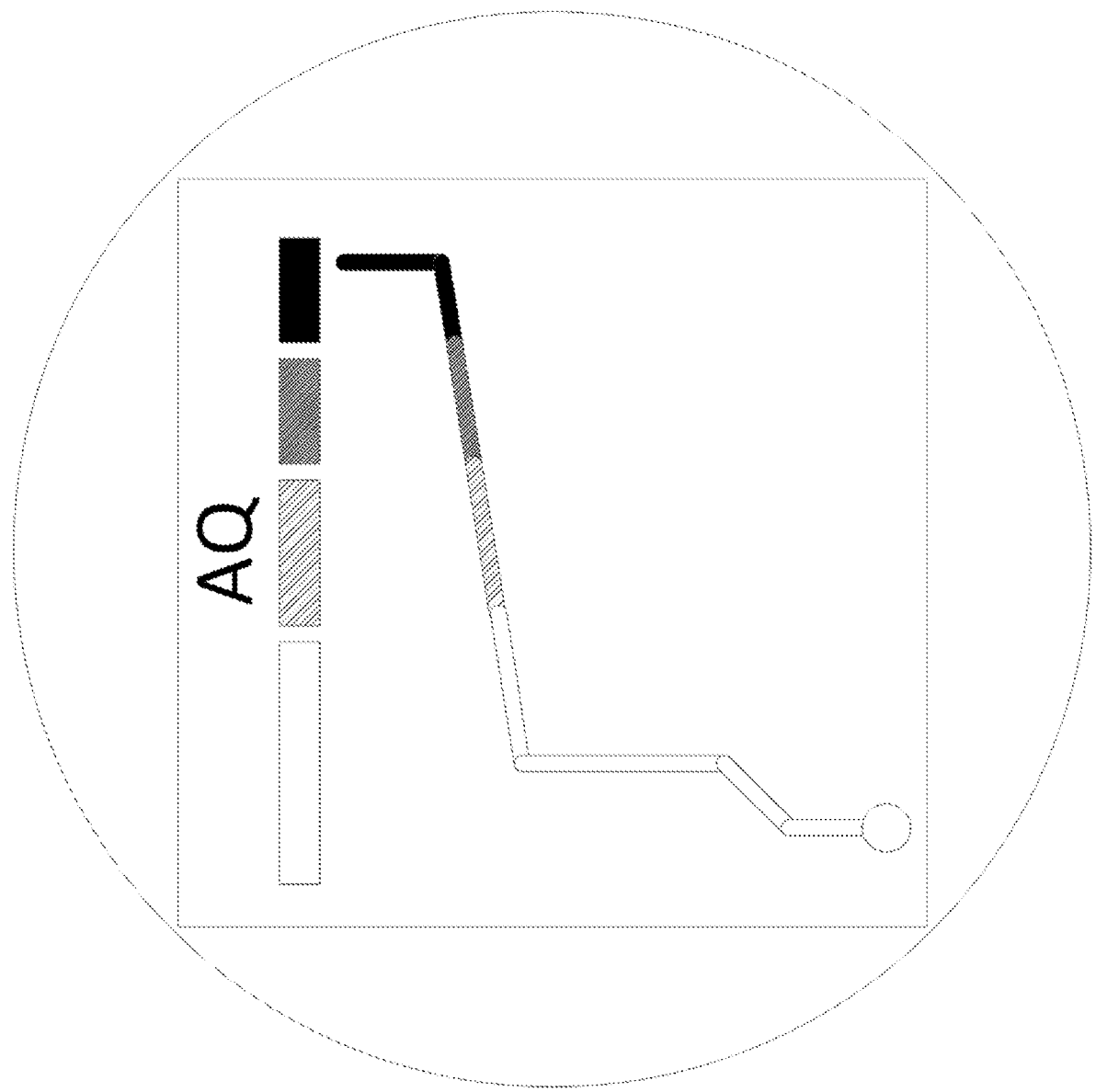
FIG. 3 illustrates schematically an embodiment of an electronic display displaying a time series plot of an overall air quality index value.

In the illustrated embodiment, the baffle wall 1420 extends up the elongate sides 1301, 1302 of the interior passage 1330 and around the upper curved section 1303, as shown in FIG. 3a. The elongate sides of the baffle wall 1420 are generally straight; whilst the lower ends of the baffle wall 1420 extend only partially into the lower curved section 1304 until they meet the interior surface of the lower curved section 1304 of the interior passage 1330 so that the primary airflow cannot enter the second airflow channel 1322 via this lower end. A gasket 1423 provided on the front end of the baffle wall 1420 also extends around the lower edge of the baffle wall 1420 to improve the seal formed between the baffle wall 1420 and the interior surface of the lower curved section 1304 of the interior passage 1320.

In addition, the baffle wall 1420 further comprises a projection 1424 at the peak/centre of upper curved section 1303 that extends from the outward facing surface of the baffle wall 1420 to the inner surface of the outer casing section 1360 thereby separating the adjacent portion of the second airflow channel 1322 from the interior passage 1330 and splitting the opening/inlet from the interior passage 1330 into the second airflow channel 1322 into two sections, each opening/inlet section extending up one of the elongate sides 1301, 1302 and partially around the upper curved section 1303 of the interior passage 1330 until they reach the projection 1424 at the peak of the upper curved section 1303.

In the illustrated embodiment, the fan assembly 1000 then comprises a valve 1400 that is arranged to direct the primary airflow to one or both of the first air outlets 1310a, 1310b and the second air outlet 1320. To do so, the valve 1400 comprises a pair of valve members 1410a, 1410b that are arranged to direct the primary airflow to one or both of the first air outlets 1310a, 1310b and the second air outlet 1320 in dependence upon the position of a pair of valve members 1410a, 1410b. Each valve member 1410a, 1410b is therefore arranged to be moveable between a first end position in which the valve member directs the primary airflow to a corresponding one of pair of first air outlets 1310a, 1310b and prevents/obstructs the airflow from reaching the second air outlet 1320, and a second end position in which the valve member directs the primary airflow to the second air outlet 1320 and prevents/obstructs the airflow from reaching the corresponding first air outlet 1310a, 1310b. When the valve members 1410a, 1410b are located in-between the first end position and the second end position, the valve members direct a first portion of the primary airflow to the first air outlets 1310*a*, 1310*b* and a second portion of the primary airflow to the second air outlet 1320. The closer the valve members 1410*a*, 1410*b* to the first end position the greater the proportion of the primary airflow that comprises the first portion that is directed to the to the first air outlets 1310*a*, 1310*b*. Conversely, the closer the valve members 1410*a*, 1410*b* to the second end position the greater the proportion of the primary airflow that comprises the second portion that is directed to the to the second air outlet 1320.

In the illustrated embodiment, the valve 1400 is provided within the interior passage 1330 of the nozzle 1300. Consequently, each valve member 1410*a*, 1410*b* is arranged to close-off the second airflow channel 1322 from the remainder of the interior passage 1330 when in the first end position so as to substantially prevent the airflow from entering the second airflow channel 1322, and to close-off a corresponding first airflow channel 1312*a*, 1312*b* from the remainder of the interior passage 1330 when in the second end position so as to substantially prevent the airflow from entering the first airflow channel 1312*a*, 1312*b*.

Figure 10:
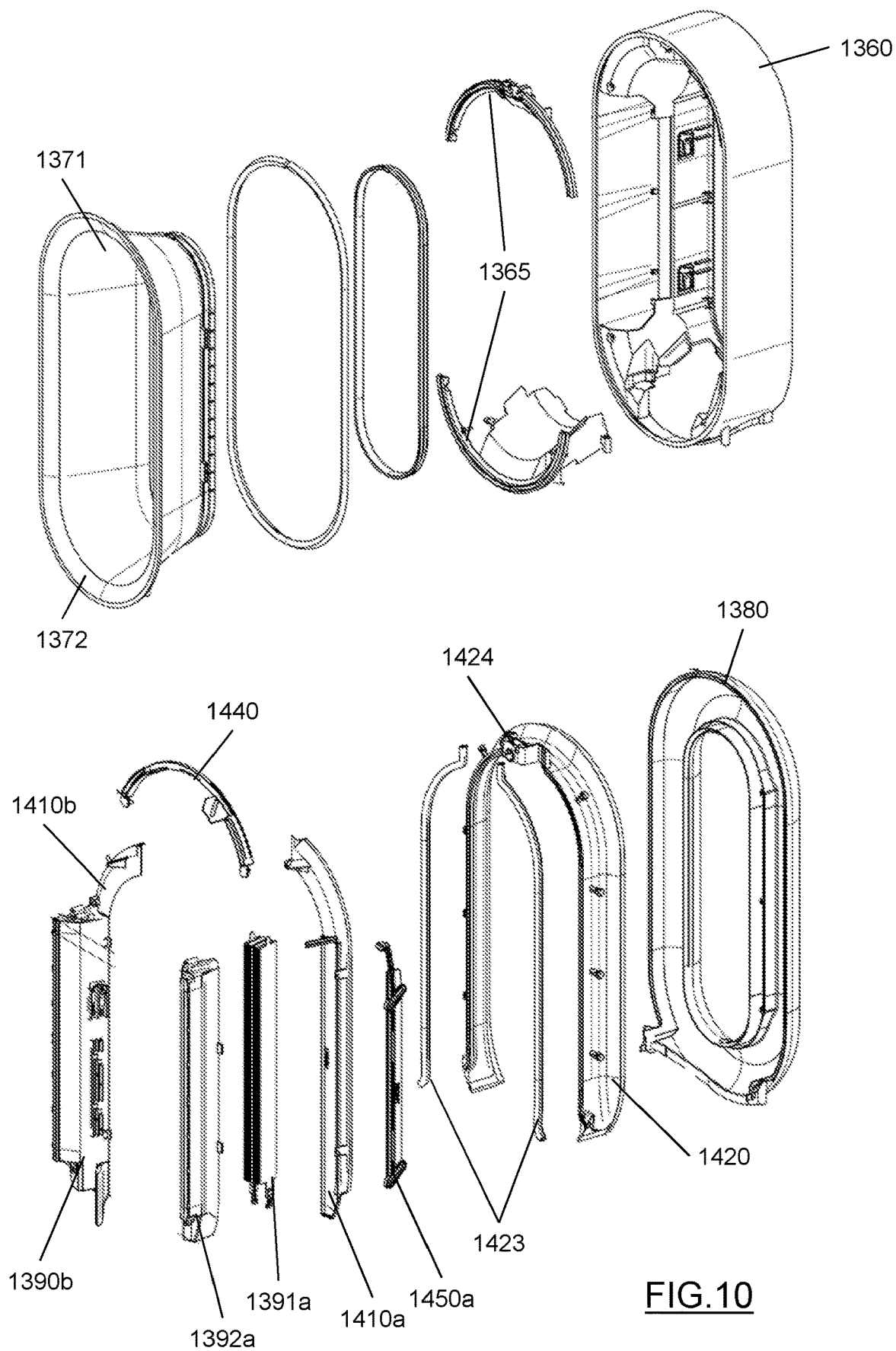
FIG. 10 is an exploded view of the nozzle of the fan assembly of FIGS. 4a and 4b.

Each valve member 1410*a*, 1410*b* is therefore arranged so that, in the first end position, the valve member 1410*a*, 1410*b* abuts/is seated against both the interior surface of the nozzle 1300 that is adjacent to the second air outlet 1320 and the baffle 1420 to thereby substantially close-off the corresponding inlet section of the second airflow channel 1322 from the remainder of the interior passage 1330. The gasket 1423 provided on the front end of the baffle wall 1420 improves the seal formed between a valve member 1410*a*, 1410*b* and the baffle 1420 when the valve member 1410*a*, 1410*b* is in the first end position. Each valve member 1410*a*, 1410*b* is also arranged so that, in the second end position, the valve member 1410*a*, 1410*b* abuts/is seated against the inner periphery/edges of the frame 1392 of the corresponding heater assembly 1390 to thereby substantially close-off the corresponding first airflow channel 1312*a*, 1312*b* from the remainder of the interior passage 1330, as illustrated in FIG. 6. The shape of each valve member 1410*a*, 1410*b* therefore substantially corresponds to/conforms with/correlates with that of the aligned section/portion of the interior passage 1330. As shown in FIG. 10, which provides an exploded view of the nozzle 1300, each valve member 1410*a*, 1410*b* is therefore generally J-shaped, having an elongate section and a curved end, and also has a generally J-shaped cross-section comprising an elongate section and a curved end.

Figure 11:
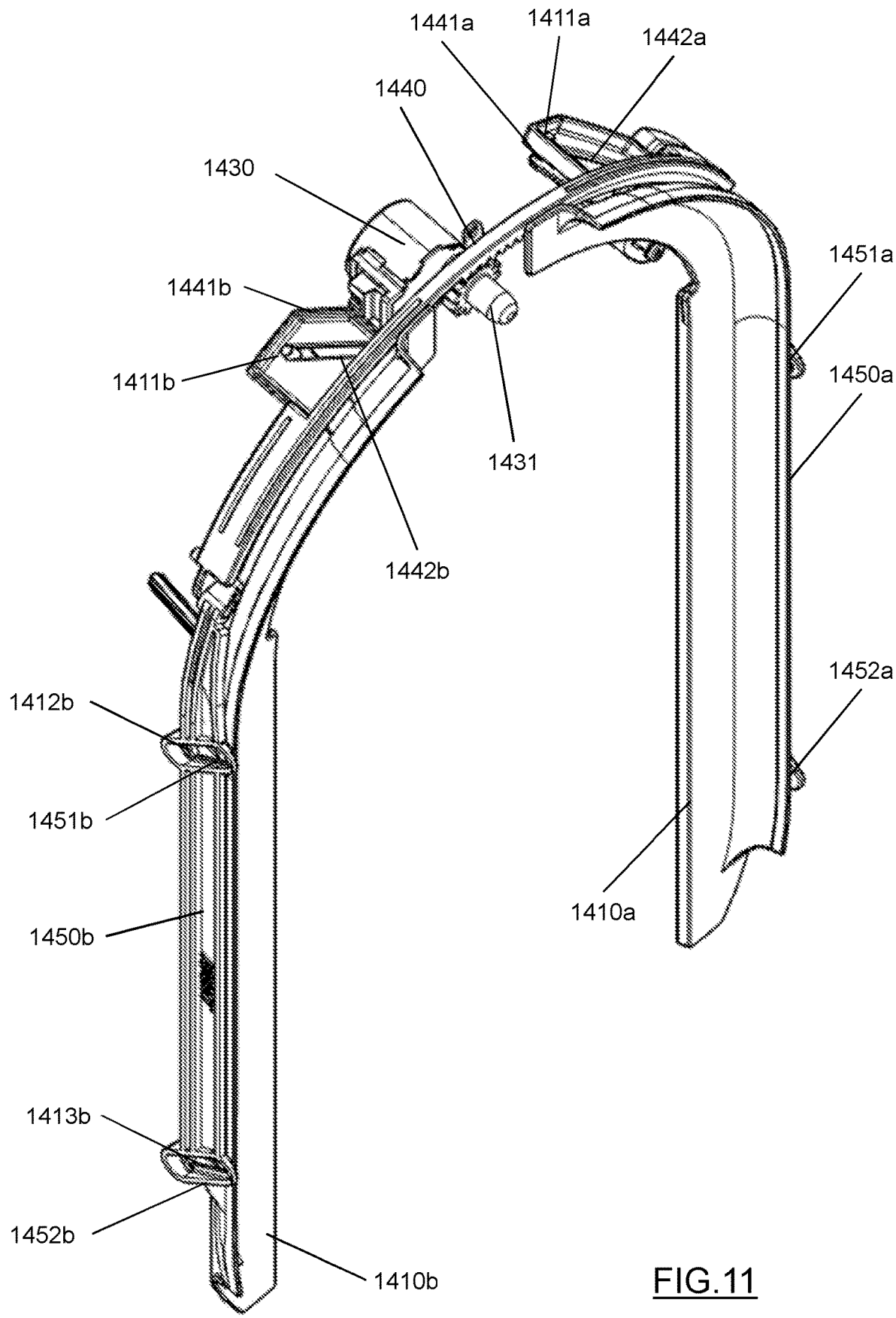
FIG. 11 is a rear perspective view of the valve of the fan assembly of FIGS. 4a and 4b.

In order to move the valve members 1410*a*, 1410*b* to any position from the first end position to the second end position the fan assembly 1000 is provided with a valve motor 1430 that is arranged to cause movement of the valve members 1410*a*, 1410*b* in response to signals received from the main control circuit 1170. As shown in FIG. 11, the valve motor 1430 is arranged to rotate a pinion 1431 that engages with a curved or arc-shaped rack 1440, with rotation of the valve motor 1430 causing rotation of both the pinion 1431 and the rack 1440, and with the valve 1400 being configured such that rotation of the rack 1440 results in movement of the valve members 1410*a*, 1410*b*.

In the illustrated embodiment, the valve motor 1430 is mounted on the baffle wall 1420 within the interior passage 1330 at the peak/centre of upper curved section 1303, with the baffle wall 1420 then being attached to the rear casing section 1380. A rotating shaft 1432 of the valve motor 1430 then projects towards the rear casing 1380, with the axis of the rotation of the shaft 1432 being parallel to the centre axis (X) of the bore/opening 1500. The pinion 1431 is mounted upon the rotating shaft 1432, with the teeth of the pinion 1431 engaging the arc-shaped rack 1440 whose shape substantially corresponds to/conforms with/correlates with that of the upper curved section 1303 of the interior passage 1330.

As the nozzle 1300 has an elongate annular shape, the rack 1440 has the shape of a minor arc wherein the rack 1440 subtends an angle that is less than 180 degrees. Specifically, the arc-shaped rack 1440 will extend around the majority of the upper curved section 1303 of the interior passage 1330 defined by the nozzle 1300, with the ends of the arc-shaped rack 1440 each being aligned with the respective elongate sides 1301, 1302 of the interior passage 1330 when mounted within the nozzle 1300

As described above, the inlets into each of the first airflow channels 1312*a*, 1312*b* and the corresponding inlet sections of the second airflow channel 1322 are aligned with one another and are substantially parallel to the central axis (X) of the opening/bore 1500 of the nozzle 1300. Consequently, in order for the valve members 1410*a*, 1410*b* to close off the second airflow channel 1322 when in the first end position and to close off the first airflow channels 1312*a*, 1312*b* when in the second end position, the valve members 1410*a*, 1410*b* are each arranged to move in a direction that is substantially parallel to the central axis (X) of the opening/bore 1500. The valve 1400 is therefore configured such that the rotation of the rack 1440 is translated into movement of the valve members 1410*a*, 1410*b* in a direction that is parallel to the central axis (X) of the opening/bore 1500.

In order to translate the rotation of the rack 1440 into movement of the valve members 1410*a*, 1410*b* in a direction that is parallel to the central axis (X) of the bore 1500, the arc-shaped rack 1440 illustrated in FIGS. 10 and 11 is provided with a pair of surfaces 1441*a*, 1441*b* that project from the rack 1440 in a direction that is parallel to the centre axis (X) of the bore 1500, with each of these projecting surfaces 1441*a*, 1441*b* being curved so as to follow the curvature of the arc-shaped rack 1440, and with the rack 1440 being configured such that the pair of surfaces 1441*a*, 1441*b* are located on opposite sides of the pinion 1431 when the pinion 1431 is engaged in the rack 1440. Each of these projecting surfaces 1441*a*, 1441*b* is then provided with a linear cam in the form of a cam slot 1442*a*, 1442*b* that extends across the curved surface at an angle of approximately 45 degrees relative to the axis of the rotation of the rack 1440, and that is arranged to be engaged by a follower pin 1411*a*, 1411*b* that projects from the corresponding valve member 1410*a*, 1410*b*, with the cam slots 1442*a*, 1442*b* provided on both of the projecting surfaces being angled in the same direction.

In addition, a first of a pair of valve actuators 1450*a* is rotatably connected/attached to a first end of the arc-shaped rack 1440 and a second of the pair of valve actuators 1450*b* is rotatably connected/attached to an opposite, second end of the arc-shaped rack 1440. Each valve actuator 1450*a*, 1450*b* is elongate (being arranged to extend along the elongate sides 1301, 1302 of the interior passage 1330) and is provided with an upper cam slot 1451 provided towards the upper end of the valve actuator 1450*a*, 1450*b* and a lower cam slot 1452 provided towards the lower end of the valve actuator 1450*a*, 1450*b*. The upper and lower cam slots 1451, 1452 extend across the corresponding valve actuator 1450*a*, 1450*b* at an angle of approximately 45 degrees relative to the centre axis (X) of the bore 1500 and are each arranged to be engaged by a follower pin 1412, 1413 that projects from the corresponding valve member 1410*a*, 1410*b*. The cam slots

1451a, 1452a on a first of the valve actuators 1450a are angled upwards as the cam slots extend from the back to the front of the valve actuator 1450a, whereas the cam slots 1451b, 1452b on a second of the valve actuators 1450b are angled downwards as the cam slots extend from the back to the front of the valve actuator 1450b.

Each valve member 1410a, 1410b therefore comprises three follower pins 1411, 1412, 1413 that are arranged to engage with the cam slot 1442 provided on the corresponding portion of the rack 1440 and the upper and lower cam slots 1451, 1452 provided on the corresponding valve actuator 1450a, 1450b respectively.

In order to move the valve members 1410a, 1410b to any position from the first end position to the second end position, the main control circuit 1170 sends a signal to the valve motor 1430 that causes the motor to rotate the shaft 1432 in one direction or the other, thereby causing rotation of the pinion 1431 provided on the shaft 1432. Engagement of the pinion 1431 with the arc-shaped rack 1440 therefore causes the rack 1440 to rotate in the same direction as the shaft 1432. Rotation of the arc-shaped rack 1440 therefore causes the angled cam slots 1442 provided on the curved surfaces 1441a, 1441b that project from the rack 1440 to move relative to the follower pin 1411 of the corresponding valve member 1410a, 1410b that is engaged within the cam slot, with the angle of the cam slots 1442a, 1442b translating the rotational movement of the arc-shaped rack 1440 into linear movement of the valve members 1410a, 1410b in a direction that is parallel to the centre axis (X) of the bore 1500. In particular, rotation of the arc-shaped rack 1440 will cause both the projecting surfaces 1441a, 1441b to rotate in the same direction. In this regard, as the cam slots 1442a, 1442b provided on the curved surfaces 1441a, 1441b that project from the rack 1440 are angled in the same direction, rotation of the curved surfaces 1441a, 1441b in the same direction is translated into horizontal movement of the first valve member 1410a and second valve member 1410b in the same direction.

In addition, rotation of the arc-shaped rack 1440 results in vertical displacement of the first and second ends of the arc-shaped rack 1440 that in-turn causes vertical displacement of the valve actuators 1450a, 1450b that are rotatably connected to the ends of the arc-shaped rack 1440. In particular, rotation of the arc-shaped rack 1440 will cause upwards movement of one of the first and second ends of the arc-shaped rack 1440 and the connected valve actuator 1450a, 1450b, and downwards movement of the other of the first and second ends of the arc-shaped rack 1440 and the connected valve actuator 1450a, 1450b. Vertical displacement of the valve actuators 1450a, 1450b causes the angled cam slots 1451, 1452 provided on the valve actuators 1450a, 1450b to move relative to the respective follower pins 1412, 1413 of the corresponding valve member 1410a, 1410b, with the angle of the cam slot 1451, 1452 translating the vertical displacement of the valve actuators 1450a, 1450b into horizontal movement of the valve members 1410a, 1410b in a direction that is parallel to the centre axis (X) of the bore 1500. In this regard, as the cam slots 1451a, 1452a provided on the first valve actuator 1450a are angled in the opposite direction to those provided on the second valve actuator 1450b, movement of the first valve actuator 1450a and the second valve actuator 1450b in opposing vertical directions is translated into horizontal movement of the first valve member 1410a and second valve member 1410b in the same direction.

To operate the fan assembly 1000 the user presses button on a user interface. The user interface may be provided on the fan assembly 1000 itself, on an associated remote control (not shown), and/or on a wireless computing device such as a tablet or smartphone (not shown) that communicates with the fan assembly 1000 wirelessly. This action by the user is communicated to the main control circuit 1170, in response to which the main control circuit 1170 activates the fan motor 1152 to rotate the impeller 1150. The rotation of the impeller 1150 causes a primary airflow to be drawn into the body 1100 through the air inlet 1110 via the purifying assemblies 1200. The user may control the speed of the fan motor 1152, and therefore the rate at which air is drawn into the body 1100 through the air inlet 1110, by manipulating the user interface. The primary airflow passes sequentially through the purifying assemblies 1200, air inlet 1110, the impeller housing 1154 and the air vent 1115 at the open upper end of the main body section 1120 to enter the interior passage 1330 of the nozzle 1300 via the air inlet 1340 located in the base 1350 of the nozzle 1300.

Within the interior passage 1330, the primary airflow is divided into two air streams which pass in opposite angular directions around the bore 1500 of the nozzle 1300, each within a respective straight section 1301, 1302 of the interior passage 1330. As the air streams pass through the interior passage 1330, air is emitted through one or both of the first air outlets 1310a, 1310b and the second air outlet 320 in dependence upon the position of the valve members 1410a, 1410b of the valve 1400.

In the illustrated embodiment, when both of the valve members 1410a, 1410b provided in the interior passage 1330 are in the first end position, the elongate section of the generally J-shaped cross-section of the valve members 1410a, 1410b will be in contact with the gasket 1423 provided on the front end of the baffle wall 1420, whilst the curved end of the generally J-shaped cross-section of the valve member 1410a, 1410b will be in contact with the overlapping portion of the inner surface of the outer casing section 1360. The valve members 1410a, 1410b will therefore substantially close-off the inlets into the second airflow channel 1322 from the remainder of the interior passage 1330 so as to substantially prevent the airflow from entering the second airflow channel 1322, and will therefore direct the entirety primary airflow to the first air outlets 1310a, 1310b. When both of the valve members 1410a, 1410b provided in the interior passage 1330 are in the second end position, the elongate section of the generally J-shaped cross-section of the valve members 1410a, 1410b will be in contact with the inner periphery/edges of the frame 1392 of the corresponding heater assembly 1390a, 1390b. The valve members 1410a, 1410b will therefore substantially close-off the first airflow channels 1312a, 1312b from the remainder of the interior passage 1330, and will therefore direct the entirety primary airflow to the second air outlet 1320. When both of the valve members 1410a, 1410b are located in-between the first end position and the second end position, then both the first airflow channels 1312a, 1312b and the second airflow channel 1322 will be open to the remainder of the interior passage 1330, with a first portion of the primary airflow being directed to the first air outlets 1310a, 1310b and a second portion of the primary airflow being directed to the second air outlet 1320.

The emission of the primary airflow or a portion of the primary airflow from the first air outlets 1310a, 1310b in a direction that is substantially parallel to a central axis (X) of the opening/bore 1500 defined by the nozzle 1300 causes a secondary airflow to be generated by the entrainment of air from the external environment, specifically from the region around the nozzle 1300. This secondary airflow combines with the primary airflow emitted from the first air outlets 1310*a*, 1310*b* to produce a combined, amplified airflow that is projected forward from the nozzle 1300. In contrast, emission of the primary airflow from the second air outlet 1320 such that the primary airflow substantially radiates/divaricates away from the fan assembly 1000 prevents this airflow from drawing air from outside the fan assembly 1000 through the opening/bore 1500 defined by the nozzle 1300, thereby producing a non-amplified airflow.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. For example, those skilled in the art will appreciate that the above-described invention might be equally applicable to other types of environmental control fan assemblies, and not just free standing fan assemblies. By way of example, such a fan assembly could be any of a freestanding fan assembly, a ceiling or wall mounted fan assembly and an in-vehicle fan assembly.

In addition, in the preferred embodiment described above, the computer implemented method is implemented by a fan assembly in which the plurality of sensors are enclosed within the base of the nozzle, such that the base of the nozzle is provided with an air inlet through which an airflow is drawn into contact with the plurality of sensors. However, in an alternative embodiment the plurality of sensors could be housed within the fan body rather than within the base of the nozzle. The fan body would then comprise both an air inlet through which an airflow is drawn into the fan assembly by the motor-driven impeller and a further air inlet through which a further airflow is drawn into contact with the plurality of sensors.

Furthermore, whilst in the preferred embodiment described herein the computer implemented method is implemented by a fan assembly incorporating the sensors, the display and the processor, in alternative embodiments the method could be implemented by a stand-alone personal computer device (e.g. smartphone, tablet etc.) comprising the processor and the display. The sensors could then be provided as integral components of the computer device, or as wired or wireless peripherals that are not integral but can be connected to the computer device. Such a stand-alone personal computer device could then be used by a user to monitor the air quality characteristics of ambient air surrounding a fan assembly using values measured by the sensors and to generate a graphic on the device display that provides an indication of the air quality of the ambient air based on the measurements received from the plurality of sensors. The user could then manually adjust the controls of the fan assembly when changes in the air quality occur, as indicated by the graphic. Alternatively, if the fan assembly has the required functionality, the personal computer device could be wirelessly connected to the fan assembly so that the fan assembly can be controlled automatically by the personal computer device in dependence upon the monitored air quality.

Although the embodiments of the invention described with reference to the drawings comprise computer processors and processes performed by computer processors, the invention also extends to computer programs, particularly computer programs on or in a carrier, adapted for putting the invention into practice. The program may be in the form of source or object code or in any other form suitable for use in the implementation of the processes according to the invention. The carrier could be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. When a program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

The invention claimed is:

1. A fan assembly comprising:
a fan body;
a motor-driven impeller housed within the fan body and arranged to generate an airflow;
a nozzle comprising a base surrounding an upper portion of the fan body and an air outlet arranged to emit the airflow from the fan assembly;
a plurality of sensors connected to the fan body and arranged to measure a value for each of a plurality of air quality characteristics;
a display positioned on the fan body and viewable through the base of the nozzle, the display arranged to present data to a user of the fan assembly;
a user interface positioned on the fan body: and
a processor connected to the fan body and configured to:
receive, from the plurality of sensors, measured values for each of the plurality of air quality characteristics;
for each of the plurality of air quality characteristics, identify one of a corresponding set of intervals within which the measured value falls and select an air quality index value associated with the identified interval;
identify the highest of the selected air quality index values as a current overall air quality index value; and
cause the display to display a time series plot of the current overall air quality index value and a number of preceding overall air quality index values.

2. The fan assembly of claim 1, wherein the processor is further configured to use the selected air quality index values to set a speed of the motor-driven impeller.

3. The fan assembly of claim 2, wherein the processor is configured to:
for each of the measured air quality characteristics, generate a corresponding speed index value using the selected air quality index value; and
set a speed of the motor-driven impeller in dependence upon the highest of the speed index values.

4. The fan assembly of claim 1, wherein the plurality of air quality characteristics comprise any of:

a concentration of $PM_{2.5}$ particles;
a concentration of $PM_{10}$ particles;
a concentration of volatile organic compounds;
a concentration of nitrogen dioxide;
a concentration of sulphur dioxide;
and a concentration of ozone.

5. The fan assembly of claim 1, wherein the plurality sensors comprise:
one or more particulate sensors;
and one or more gas sensors.

6. The fan assembly of claim 5, wherein the one or more particulate sensors are arranged to measure a value indicative of a concentration of particles with a diameter that is 2.5 μm or less and measure a value indicative of a concentration of particles with a diameter that is 10 μm or less.

7. The fan assembly of claim 6, wherein the one or more gas sensors are arranged to measure a value indicative of each of a concentration of volatile organic compounds and a concentration of nitrogen dioxide.

8. The fan assembly of claim 7, wherein the one or more gas sensors comprise a reducing gas sensor and an oxidising sensor.

9. The fan assembly of claim 8, wherein the reducing gas sensor is arranged to provide a value indicative of a concentration of volatile organic compounds and the oxidising sensor is arranged to provide a value indicative of a concentration of nitrogen dioxide.

10. The fan assembly of claim 5, wherein the one or more particulate sensors are arranged to measure a value indicative of a concentration of particles with a median aerodynamic diameter of less than 2.5 μm and measure a value indicative of a concentration of particles with a median aerodynamic diameter of less than 10 μm.

11. The fan assembly of claim 1, wherein, to cause the display to display a time series plot of the current overall air quality index value and a number of preceding overall air quality index values, the processor is configured to:
for each of the current overall air quality index value and a number of preceding overall air quality index values, generate a component on the display representing the overall air quality index value within the time series plot.

12. The fan assembly of claim 11, wherein the processor is further configured to:
for each of the current overall air quality index value and a number of preceding overall air quality index values, identify one of a corresponding plurality of intervals within which the overall air quality index value falls, select a colour associated with the identified interval, and generate the component representing the overall air quality index value of the time series plot on the display using the selected colour.

13. The fan assembly of claim 1, wherein the processor is configured to perform the step of causing the display to display a time series plot of the current overall air quality index value and a number of preceding overall air quality index values with a frequency of 10 hertz or less.

14. The fan assembly of claim 1, wherein the plurality of sensors are configured to perform measurement of a value for each of a plurality of air quality characteristics with a frequency of 10 hertz or less.

15. The fan assembly of claim 1, and further comprising a memory storing the set of intervals corresponding to each of the measured air quality characteristics.

16. The fan assembly of claim 15, wherein the set of intervals corresponding to each of the measured air quality characteristics stored in the memory vary in size.

17. The fan assembly of claim 1, and further comprising at least one filter assembly that is arranged to purify the airflow before the airflow is emitted from the fan assembly.

18. The fan assembly of claim 17, and further comprising an air inlet through which an airflow is drawn into the fan assembly by the motor-driven impeller.

19. The fan assembly of claim 18, wherein the at least one filter assembly is mounted over the air inlet.

20. The fan assembly of claim 18, and comprising a further air inlet through which a further airflow is drawn into the fan assembly and into contact with the plurality of sensors.

21. The fan assembly of claim 20, wherein the nozzle is mounted on the fan body, the air outlet being provided by the nozzle, and the nozzle being arranged to receive the airflow from the fan body and to emit the airflow from the air outlet.

22. The fan assembly of claim 21, wherein the plurality of sensors are housed within the fan body and the fan body comprises both the air inlet and the further air inlet.

23. The fan assembly of claim 21, wherein the base connects to an upper end of the fan body and the plurality of sensors are enclosed within the base of the nozzle.

24. The fan assembly of claim 23, wherein the fan body comprises the air inlet, and the base of the nozzle comprises the further air inlet.

25. A method of generating a display on a fan assembly providing an indication of air quality, the method comprising:
providing the fan assembly, the fan assembly having a fan body, a motor-driven impeller housed within the fan body and arranged to generate an airflow, and a nozzle including a base surrounding an upper portion of the fan body and an air outlet arranged to emit the airflow from the fan assembly;
using a plurality of sensors positioned on the fan assembly to measure a value for each of a plurality of air quality characteristics;
using a processor to:
for each of the measured air quality characteristics, identify one of a corresponding set of intervals within which the measured value falls and select an air quality index value associated with the identified interval;
identify the highest of the selected air quality index values as a current overall air quality index value;
generate on a display positioned on the fan body and viewable through the base of the nozzle a time series plot of the current overall air quality index value and a number of preceding overall air quality index values; and
adjust an operating condition of the fan assembly either automatically based on the current overall air quality index value or in response to a user input on a user interface positioned on the fan assembly.

26. The method of claim 25, and further comprising:
using the selected air quality index values to set a speed of the motor-driven impeller.

27. The method of claim 26, and further comprising:
for each of the measured air quality characteristics, generating a corresponding speed value using the selected air quality index value; and
setting a speed of the motor-driven impeller in dependence upon the highest of the speed values.

28. The method of claim 25, wherein the plurality of air quality characteristics comprise any of:
a concentration of $PM_{2.5}$ particles;
a concentration of $PM_{10}$ particles;

a concentration of volatile organic compounds;
a concentration of nitrogen dioxide;
a concentration of sulphur dioxide; and
a concentration of ozone.

29. The method of claim 25, wherein the plurality sensors comprise:
one or more particulate sensors; and
one or more gas sensors.

30. The method of claim 29, wherein the one or more particulate sensors measure a value indicative of a concentration of particles with a diameter that is 2.5 µm or less and measure a value indicative of a concentration of particles with a diameter that is 10 µm or less.

31. The method of claim 30, wherein the one or more gas sensors measure a value indicative of each of a concentration of volatile organic compounds and a concentration of nitrogen dioxide.

32. The method of claim 29, wherein the one or more particulate sensors measure a value indicative of a concentration of particles with a median aerodynamic diameter of less than 2.5 µm and measure a value indicative of a concentration of particles with a median aerodynamic diameter of less than 10 µm.

33. The method of claim 25, wherein the step of generating on a display a time series plot of the current overall air quality index value and a number of preceding overall air quality index values comprises:
for each of the current overall air quality index value and a number of preceding overall air quality index values, generating a component on the display representing the overall air quality index value within the time series plot.

34. The method of claim 33, and further comprising:
for each of the current overall air quality index value and a number of preceding overall air quality index values, identifying one of a corresponding plurality of intervals within which the overall air quality index value falls, selecting a colour associated with the identified interval, and generating the component representing the overall air quality index value of the time series plot on the display using the selected colour.

35. The method of claim 25, wherein the step of causing the display to display a time series plot of the current overall air quality index value and a number of preceding overall air quality index values is performed with a frequency of 10 hertz or less.

36. The method of claim 25, wherein the plurality of sensors perform measurement of a value for each of a plurality of air quality characteristics with a frequency of 10 hertz or less.

37. The method of claim 25, wherein for each of the measured air quality characteristics the corresponding set of intervals vary in size.

* * * * *